US011022200B2

(12) United States Patent
Tesar

(10) Patent No.: US 11,022,200 B2
(45) Date of Patent: Jun. 1, 2021

(54) SIMPLIFIED PARALLEL ECCENTRIC ROTARY ACTUATOR

(71) Applicant: Delbert Tesar, Austin, TX (US)

(72) Inventor: Delbert Tesar, Austin, TX (US)

( * ) Notice: Subject to any disclaimer, the term of this patent is extended or adjusted under 35 U.S.C. 154(b) by 0 days.

(21) Appl. No.: 16/788,305

(22) Filed: Feb. 12, 2020

(65) Prior Publication Data

US 2020/0362943 A1   Nov. 19, 2020

Related U.S. Application Data

(63) Continuation-in-part of application No. 15/883,347, filed on Jan. 30, 2018, now Pat. No. 10,801,586, and a continuation-in-part of application No. 15/474,817, filed on Mar. 30, 2017, now Pat. No. 10,655,706, said application No. 15/883,347 is a continuation of (Continued)

(51) Int. Cl.
*F16H 1/32* (2006.01)
*H02K 7/116* (2006.01)
*F16H 57/08* (2006.01)
*F16H 55/17* (2006.01)

(52) U.S. Cl.
CPC ............ *F16H 1/32* (2013.01); *F16H 55/17* (2013.01); *F16H 57/08* (2013.01); *H02K 7/116* (2013.01); *F16H 2001/323* (2013.01)

(58) Field of Classification Search
CPC . F16H 1/32; F16H 55/17; F16H 57/08; F16H 2001/323; H02K 7/116
See application file for complete search history.

(56) References Cited

U.S. PATENT DOCUMENTS

| 381,395 A | 4/1888 | Love |
| 1,973,185 A | 9/1934 | Treojevich |

(Continued)

FOREIGN PATENT DOCUMENTS

| GB | 2023753 A | 6/1978 |
| GB | 2100372 A | 12/1982 |

*Primary Examiner* — Justin Holmes
(74) *Attorney, Agent, or Firm* — John A. Fortkort; Fortkort & Houston PC

(57) ABSTRACT

A rotary actuator (101) is provided which includes first and second opposing endplates (107); a stator (105) having a first end which is attached to said first endplate, and a second end which is attached to said second endplate; a rotor (103) having first and second eccentrics (125) on a surface thereof; an output attachment ring gear (135) disposed about the periphery of said first and second opposing endplates; a first parallel eccentric gear (131) which is disposed between said first eccentric and said output gear and which meshes with said output gear; a second parallel eccentric gear which is disposed between said second eccentric and said output gear and which meshes with said output gear; a first crosslink (113) which engages said first endplate and said first eccentric gear by way of a first set of surface features (143, 153); and a second crosslink which meshes with said second endplate and said second eccentric gear by way of a second set of surface features. The rotary actuator further includes a star compound gear train which includes a star gear which is in mesh with the output gear across a second mesh, wherein the first mesh is radially separated from the second mesh across an open space.

20 Claims, 25 Drawing Sheets

Related U.S. Application Data application No. 14/869,994, filed on Sep. 29, 2015, now Pat. No. 9,915,319, said application No. 15/474,817 is a continuation of application No. 14/732,286, filed on Jun. 5, 2015, now Pat. No. 9,657,813.

(60) Provisional application No. 62/210,223, filed on Aug. 26, 2015, provisional application No. 62/057,216, filed on Sep. 29, 2014, provisional application No. 62/008,586, filed on Jun. 6, 2014.

(56) References Cited

U.S. PATENT DOCUMENTS

| | | | |
|---|---|---|---|
| 2,140,012 | A | 12/1938 | Hayes |
| 2,195,783 | A | 4/1940 | Ravigneaux |
| 2,231,784 | A | 2/1941 | Von Thungen |
| 2,241,764 | A | 5/1941 | Bollinger et al. |
| 2,311,006 | A | 2/1943 | Trbojevich |
| 2,320,757 | A | 6/1943 | Sinclair et al. |
| 2,534,134 | A | 12/1950 | Kirkpatrick |
| 2,627,190 | A | 2/1953 | Böttcher |
| 2,703,021 | A | 3/1955 | Stoeckicht |
| 2,844,052 | A | 7/1958 | Stoeckicht |
| 2,861,465 | A | 11/1958 | Winkle et al. |
| 3,064,491 | A | 11/1962 | Bishop |
| 3,095,757 | A | 7/1963 | Thoma |
| 3,150,532 | A | 9/1964 | Bixby |
| 3,251,236 | A | 5/1966 | Wildhaber |
| 3,396,632 | A | 8/1968 | Leblanc |
| 3,397,589 | A | 8/1968 | Moore |
| 3,563,354 | A | 2/1971 | Sigg |
| 3,719,841 | A | 3/1973 | Ritsema |
| 3,742,568 | A | 7/1973 | Hahlbeck |
| 3,772,932 | A | 11/1973 | Nagano |
| 3,813,821 | A | 6/1974 | Takahashi |
| 3,823,620 | A | 7/1974 | Bricout |
| 3,888,134 | A | 6/1975 | Miranda |
| 3,901,092 | A | 8/1975 | Romick |
| 3,907,470 | A | 9/1975 | Harle et al. |
| 3,941,013 | A | 3/1976 | Miller |
| 4,024,959 | A | 5/1977 | Gruner |
| 4,158,967 | A | 6/1979 | Vatterott |
| 4,186,626 | A | 2/1980 | Chamberelain |
| 4,237,741 | A | 12/1980 | Huf et al. |
| 4,280,583 | A | 7/1981 | Stieg |
| 4,297,918 | A | 11/1981 | Perry |
| 4,378,660 | A | 4/1983 | Weiner |
| 4,381,828 | A | 5/1983 | Lunn et al. |
| 4,407,382 | A | 10/1983 | Ddziuba et al. |
| 4,416,345 | A | 11/1983 | Barthelemy |
| 4,417,642 | A | 11/1983 | Suzuki et al. |
| 4,461,375 | A | 7/1984 | Brown |
| 4,462,271 | A | 7/1984 | Stieg |
| 4,467,568 | A | 8/1984 | Bloch et al. |
| 4,505,166 | A | 3/1985 | Tesar |
| 4,540,073 | A | 9/1985 | Rogier |
| 4,547,107 | A | 10/1985 | Krause |
| 4,554,842 | A | 11/1985 | Wood, III |
| 4,560,056 | A | 12/1985 | Stockton |
| 4,569,252 | A | 2/1986 | Harper |
| 4,583,413 | A | 4/1986 | Lack |
| 4,624,154 | A | 11/1986 | Kraft et al. |
| 4,706,512 | A | 11/1987 | McKernon et al. |
| 4,721,013 | A | 1/1988 | Stuer et al. |
| 4,817,773 | A | 4/1989 | Knodel et al. |
| 5,355,743 | A | 10/1994 | Tesar |
| 5,908,372 | A | 6/1999 | Janek |
| 6,508,737 | B2 * | 1/2003 | Fujimoto ........ F16H 1/32 475/178 |
| 6,791,215 | B2 | 9/2004 | Tesar |
| 7,081,062 | B2 | 7/2006 | Tesar |
| 7,122,926 | B2 | 10/2006 | Tesar |
| 7,431,676 | B2 | 10/2008 | Tesar |
| 7,604,559 | B2 | 10/2009 | Fujimoto et al. |
| 7,722,494 | B2 | 5/2010 | Tesar |
| 8,033,942 | B2 | 10/2011 | Tesar |
| 8,403,789 | B2 | 3/2013 | Janek |
| 8,808,130 | B2 * | 8/2014 | Wilkins ........ F16H 1/32 475/170 |
| 9,005,065 | B2 * | 4/2015 | Huang ........ F16H 1/32 475/168 |
| 2004/0007923 | A1 | 1/2004 | Tesar |
| 2004/0102274 | A1 | 5/2004 | Tesar |
| 2004/0103742 | A1 | 6/2004 | Tesar |
| 2005/0168084 | A1 | 8/2005 | Tesar |
| 2007/0168081 | A1 | 7/2007 | Shin et al. |
| 2007/0249457 | A1 | 10/2007 | Tesar |
| 2008/0257088 | A1 | 10/2008 | Tesar |
| 2008/0269922 | A1 | 10/2008 | Tesar |
| 2009/0075771 | A1 | 3/2009 | Tesar |
| 2012/0088622 | A1 | 4/2012 | Tesar |
| 2012/0204671 | A1 | 8/2012 | Tesar |
| 2012/0215450 | A1 | 8/2012 | Ashok et al. |
| 2013/0023373 | A1 | 1/2013 | Janek |
| 2013/0217530 | A1 | 8/2013 | Tesar |
| 2014/0224064 | A1 | 8/2014 | Tesar |
| 2014/0228162 | A1 | 8/2014 | Tesar |
| 2014/0246893 | A1 | 9/2014 | Tesar |
| 2015/0102655 | A1 | 4/2015 | Tesar |
| 2015/0292601 | A1 | 10/2015 | Tesar |
| 2015/0330455 | A1 | 11/2015 | Tesar |
| 2015/0354667 | A1 | 12/2015 | Tesar |
| 2016/0091054 | A1 | 3/2016 | Tesar |
| 2016/0137051 | A1 | 5/2016 | Tesar |
| 2016/0138679 | A1 | 5/2016 | Tesar |

* cited by examiner

| BACKFIELD HANDLING SYSTEM HYDRAULICS ||
|---|---|
| John Deere Harvester | |
| 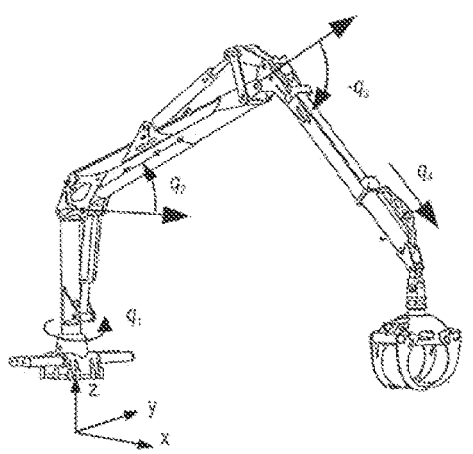<br>Hydraulic Manipulator | 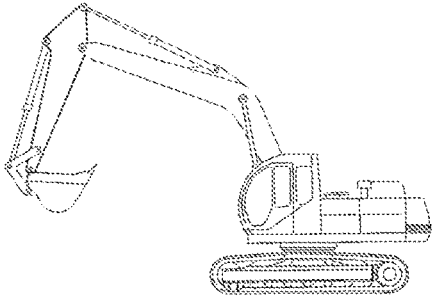<br>Backfitted EMA Excavator<br><br>• BATTLEFIELD SUSTAINMENT<br>  • Material Transfer<br>    - Sea, Shore, Beyond<br>    - High Performance Intelligence<br>    - Ruggedness/Survivability<br><br>• BACKFIT HYDRAULICS<br>  • 20,000 Hour Durability<br>    - Shock resistant<br>    - Condition based maintenance |
| 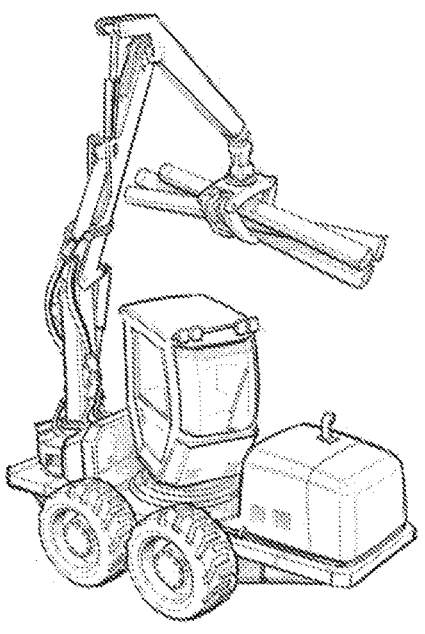<br>360° Crew Cab | |

*FIG. 16*

SIMPLIFIED PARALLEL ECCENTRIC ROTARY ACTUATOR

CROSS-REFERENCE TO RELATED APPLICATION

This application is a continuation-in-part of U.S. Ser. No. 15/474,817, filed on Mar. 30, 2017, which has the same inventor and which is entitled "MODIFIED PARALLEL ECCENTRIC ROTARY ACTUATOR", and which is incorporated herein by reference in its entirety; which is a continuation of U.S. Ser. No. 14/732,286, filed on Jun. 5, 2015, now U.S. Pat. No. 9,657,813, which has the same inventor and title, and which is incorporated herein by reference in its entirety; which claims the benefit of priority from U.S. Provisional Application No. 62/008,586, filed on Jun. 6, 2014, which has the same title and the same inventor, and which is incorporated herein by reference in its entirety. This application is also a continuation-in-part of U.S. Ser. No. 15/883,347, filed on Jan. 20, 2018, having the same inventor and entitled "COMPACT PARALLEL ECCENTRIC ROTARY ACTUATOR", and which is incorporated herein by reference in its entirety; which is a continuation of U.S. Ser. No. 14/869,994, filed on Sep. 29, 2015, now U.S. Pat. No. 9,915,319, having the same inventor and the same title, and which is incorporated herein by reference in its entirety; which claims the benefit of priority from U.S. Provisional Application No. 62/057,216, filed Sep. 29, 2014, having the same inventor and the same title, and which is incorporated herein by reference in its entirety, and which also claims the benefit of priority from U.S. Provisional Application No. 62/210,223, filed Aug. 26, 2015, having the same inventor and the same title, and which is incorporated herein by reference in its entirety.

FIELD OF THE DISCLOSURE

The present disclosure relates generally to rotary actuators, and more particularly to parallel eccentric rotary actuators having a simplified design.

BACKGROUND OF THE DISCLOSURE

The history of standard gear manufacture as represented by the AGMA (American Gear Manufacturers Association) has created a very useful tech base for standard compound gears with parallel shafts, sometimes using helical gear teeth to enable a contact ratio of a little more than 2 teeth in contact. The gears are widely used in transmissions to switch gear ratios utilizing synchro clutches with multiple gears on a principal shaft with another set of gears on a parallel offset shaft. Numerous instances of these so-called parallel compound gears are known to the art.

By contrast, parallel eccentric gear reducers may be represented in, for example, U.S. Pat. No. 8,403,789 (Janek). This patent, which is assigned to Spinea S. R. O., discloses a gear train for a parallel eccentric rotary actuator which is reproduced in FIG. 22. The gear train disclosed therein includes a central ring gear 40, left and right endplates 50, a bearing ring 46, a seal 93, left and right crosslinks 80 equipped with rollers in grooves (not shown), a crankshaft bearing 10, radial axle bearings 43a, 43b, 43c, a cycloidal curve 30, needles 41b, and through bolts 95.

Other gear trains by Spinea of this general type are described, for example, in 2013/0023373 (Janek) and U.S. Pat. No. 5,908,372 (Janek). U.S. Pat. No. 7,604,559 (Fujimoto et al.), assigned to Nabtesco Corporation, discloses an eccentrically oscillating gear device. This device, which is depicted in FIGS. 23-25, is equipped with an internal gear 15 having internal gear pins 15a, a carrier 11 rotating relative to the internal gear, three sets of parallel bearing crankshafts 19, 20 that have a rolling element and a ring body for supporting the rolling element, multiple crank shafts supported by the carrier so as to be freely rotatable and external gears 13, 14 that are equipped with external teeth having a trochoid tooth profile whose tooth top portions are cut out, and disposed between the pair of bearings. The outer peripheries of the external gears are engaged with the internal gear pins and fitted to the crank portion of the crank shaft. The eccentrically oscillating gear device is designed so that the external gear makes an eccentrically oscillating motion by rotation of 3 paired crank shafts and the rotational output is taken out from the internal gear or the carrier.

BRIEF DESCRIPTION OF THE DRAWINGS

FIG. 16 is an illustration of backfitting handling system hydraulics with the electromechanical actuators disclosed herein.

SUMMARY OF THE DISCLOSURE

Figure 1:
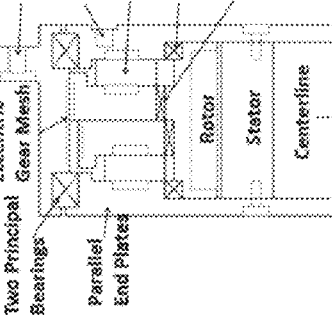
FIG. 1 is a tabulation of some key features of a preferred embodiment of a simplified parallel eccentric actuator in accordance with the teachings herein.

In one aspect, a rotary actuator is provided which comprises (a) first and second opposing endplates; (b) a stator having a first end which is attached to said first endplate, and a second end which is attached to said second endplate; (c) a rotor having a first eccentric on a surface thereof; (d) an output gear disposed about the periphery of said first and second opposing endplates; (e) a first parallel eccentric gear which is disposed between said first eccentric and said output gear and which meshes with said output gear across a first mesh; (f) a first crosslink which engages said first endplate and said first eccentric gear by way of a first set of surface features; and (g) a star compound gear train which includes a star gear which is in mesh with said output gear across a second mesh; wherein said first mesh is radially separated from said second mesh across an open space.

In another aspect, an electromechanical actuator is provided which comprises (a) first and second opposing endplates; (b) an output gear disposed about the periphery of said first and second opposing endplates; (c) a first parallel eccentric gear which is disposed between said first eccentric and said output gear and which meshes with said output gear; (d) a second parallel eccentric gear which is disposed between said second eccentric and said output gear and which meshes with said output gear; (e) a first crosslink which engages said first endplate and said first eccentric gear by way of a first set of surface features; (f) a second crosslink which meshes with said second endplate and said second eccentric gear by way of a second set of surface features; (g) a crankshaft having first and second eccentrics thereon which engage said first and second parallel eccentric gears; and (h) a star compound gear train which includes a star gear which is in mesh with said output gear across a second mesh; wherein said first mesh is radially separated from said second mesh across an open space.

DETAILED DESCRIPTION

Although parallel eccentric actuators are known to the art as implemented in the aforementioned actuators produced by Nabtesco and Spinea (and in other similar actuators produced by Sumitomo), many of these actuators utilize a cycloidal wave/pin mesh. Such a mesh is very inefficient (45° pressure angle) and exhibits high sliding friction and high internal force magnification. Further, many of these actuators utilize multiple parallel crankshafts, each equipped with 4 rolling element bearings, which results in high compliance and low overall gear train stiffness.

While standard compound gears of this type may be useful for rather simple duty cycles with limited positive/negative contact force crossovers, more intelligent systems are required to meet the increasingly complex duty cycles required of modern machines. Such complex duty cycles may include, for example, the control of wing surfaces for a fighter aircraft in a dogfight, the drive of orthotic structures to enable challenging operations such as stair climbing, or the control of independent wheel drives of off-terrain vehicles. Duty cycles of this type demand intelligence to rapidly respond to a wide range of commands so as to utilize a high level of beneficial internal nonlinearity in the driving actuators.

In order to be effective, it is preferred that these actuators not rely on the simple gear train technology of the past. In particular, the essential absence of backlash, the reduction or elimination of rolling element bearings, and the provision of high torque density, high efficiency and high shock resistance now become essential in order to meet the performance requirements of an ever-expanding range of applications. These performance requirements may require the actuator to replace hydraulic systems, and to exhibit improved responsiveness, minimize weight and reducing noise.

Recently, significant improvements in the art have resulted in a new family of parallel eccentric actuators. These actuators are described, for example, in U.S. Ser. No. 14/732,286 (Tesar), filed on Jun. 5, 2015 and entitled "Modified Parallel Eccentric Rotary Actuator", which is incorporated herein by reference in its entirety; and in U.S. Ser. No. 14/869,994 (Tesar), filed on Sep. 29, 2015 and entitled "Compact Parallel Eccentric Rotary Actuator", which is also incorporated herein by reference in its entirety. However, while these actuators represent a notable advance in the art, further improvements in parallel eccentric rotary actuators are still required, especially for certain types of applications.

In particular, a need exists in the art for rotary actuators which leverage the principles described in the foregoing applications, and yet which have a simplified construction that reduces the cost of these devices and facilitates their manufacture. Such actuators should preferably utilize circular arc gear teeth, avoid the use of a large number of rolling element bearings, provide a load-carrying structure (preferably in the form of Oldham crosslinks with high contact surface stiffness), reduce (or more preferably, virtually eliminate) any effective inertia, and provide exceptional rigidity and shock resistance. These and other needs may be met by the actuators described herein.

FIGS. 1-7 depict a first particular, non-limiting embodiment of a simplified parallel eccentric rotary actuator in accordance with the teachings herein. In the subsequent description of these figures, reference will frequently be made to "bearings". One skilled in the art will understand that each such reference is typically to a bearing assembly, which will typically include one or more races that contain multiple (often 8 or more) bearing elements (such as, for example, ball bearings or tapered bearings).

Figure 2:
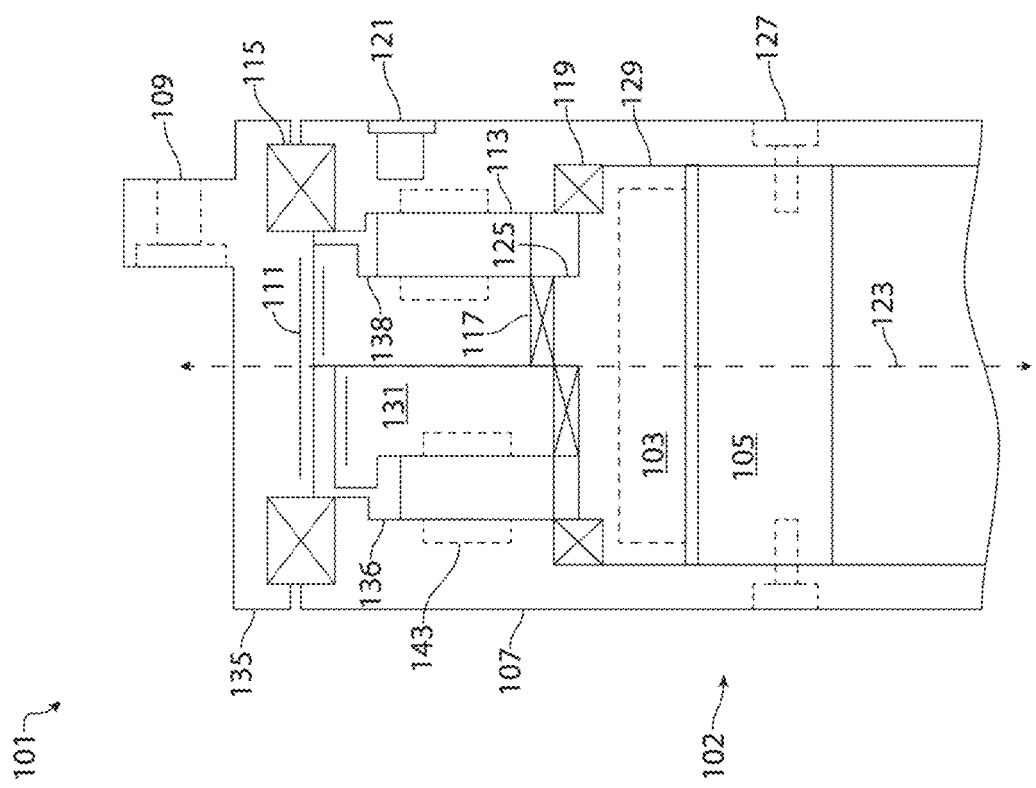
FIG. 2 is a cross-sectional view of a preferred embodiment of a simplified parallel eccentric actuator in accordance with the teachings herein which has a hollow pancake design. This design utilizes minimum lightly loaded bearings to provide high torque density and high stiffness.

With reference to FIG. 2, the simplified parallel eccentric rotary actuator 101 depicted therein comprises a motor rotor 103 and stator 105 which are disposed between parallel endplates 107 and which rotatingly drive an output attachment ring gear 135 across an internal gear mesh 111. The output attachment ring gear 135 is centrally disposed around, and rotates about, the centerline 123 of the actuator 101. The stiffness of the actuator is assured through the use of crosslinks 113. The actuator 101 utilizes two principal bearings 115, eccentric lightly loaded gear bearings 117 and rotor bearings 119. A reference lug attachment 109 is provided on one end of the rotating output attachment ring gear 135.

Still referring to FIG. 2, the actuator is equipped with two endplates 107 which hold the stator 105 in a stationary (and preferably rigid) fashion. The endplates 107 are equipped with depressions which hold the principal bearings 115. The principal bearings 115, in turn, support the output attachment ring gear 135, which has an internal gear mesh 111. Thus, a shell is formed which is bound together with the two principal bearings 115, the internal gear mesh 111 of the output attachment ring gear 135, and the endplates 107. The endplates 107 are held together with the stator 105, thus rigidizing the structure for exceptional ruggedness.

The stator 105 drives the rotor 103, which rotates (in a direction perpendicular to the page in FIG. 2) on two bearings 119. These bearings 119, which are preferably ball bearings, are disposed on either side of the rotor 103. Notably, these lightly loaded bearings 119 are positioned on the outside of the rotor 103, rather than inside, thus providing solid endplate support for the bearings 119. The crankshaft 102 is attached rigidly to the rotor 103. The rotor 103 has two drive eccentric lobes 125, each of which carries a lobe bearing 117. The lobe bearings 117 are preferably needle bearings.

The two parallel eccentric gears 131 are positioned immediately above the eccentric gear bearings 117 and in a side-by-side arrangement. Preferably, a (typically cylindrical) wave spring is placed between the eccentric gears 131 and/or the eccentric gear bearings 117, and the parallel eccentric gears 131, the rotor 103, or both may be notched to accommodate the wave spring. This arrangement pushes the eccentric gears 131 away from each other and against the wedge in the crosslinks 113, thus preloading the tongue and groove wedges on crosslinks 113.

Figure 6:
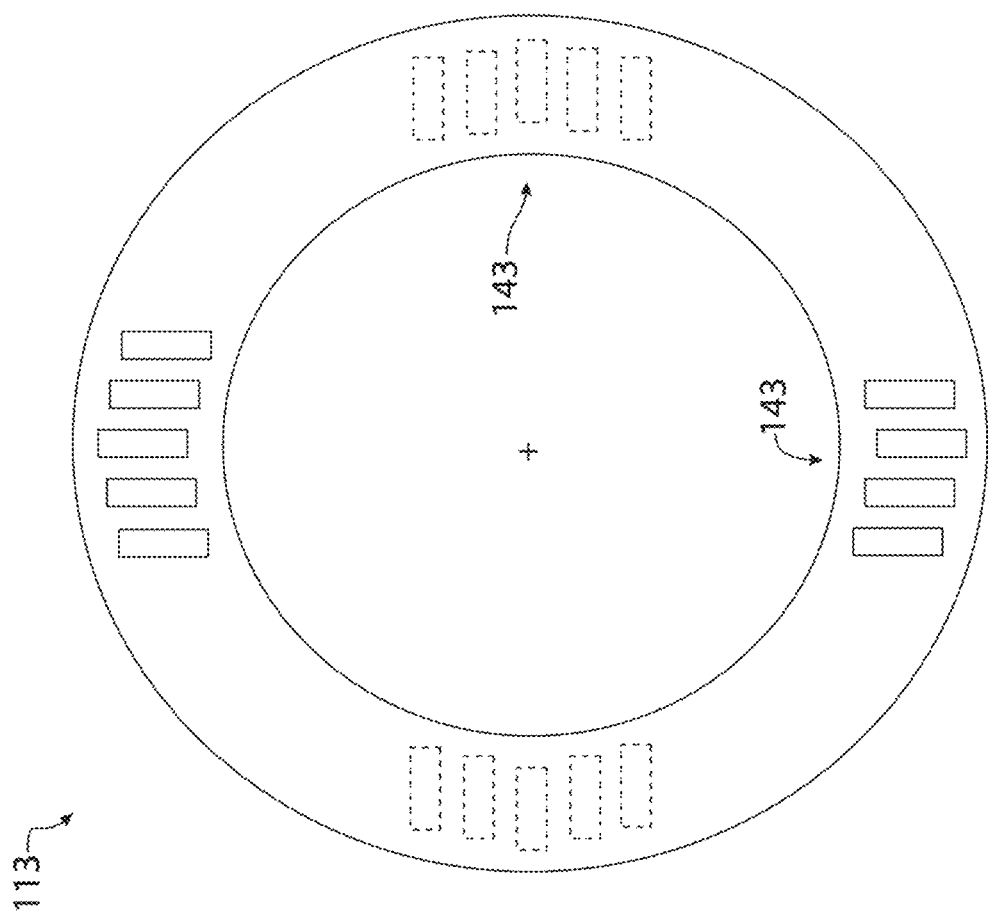
FIG. 6 is a front view of one of the crosslinks utilized in the actuator of FIG. 2. The crosslink is equipped with opposing sets of tongues disposed on first and second major surfaces of the crosslink. Each set of tongues on one surface of the crosslink is rotationally disposed by 90° from the sets of tongues disposed on the opposing surface of the crosslink.

As seen in FIG. 6, each of the crosslinks 113 has a first major surface with opposing sets of tongues 143 disposed thereon, and a second major surface which also has opposing sets of tongues 143 disposed thereon. Moreover, each set of tongues on each major surface of each crosslink 113 is rotated 90° with respect to the sets of tongues 143 on the opposing major surface of the crosslink 113. The sets of tongues 143 are depicted in dashed lines in FIG. 2, from which it may be appreciated that the sets of tongues 143 on a first major surface of each crosslink 113 engage a complimentary set of grooves disposed in the adjacent surface of the adjacent eccentric gear 131, and the sets of tongues 143 on the opposing second major surface of each crosslink 113 engage a complimentary set of grooves disposed in the adjacent surface of the adjacent endplate 107.

In some embodiments, the crosslinks 113 may be equipped with lubrication systems or devices. Examples of a suitable lubrication systems that may be incorporated into the crosslinks of the actuators described herein is described in FIG. 16 and the associated text of U.S. Ser. No. 14/869,994 (Tesar), filed on Sep. 29, 2015 and entitled "Compact Parallel Eccentric Rotary Actuator", which is also incorporated herein by reference in its entirety, and in FIGS. 26-27 and the associated text of U.S. Ser. No. 14/732,286 (Tesar), filed on Jun. 5, 2015 and entitled "Modified Parallel Eccentric Rotary Actuator", which is incorporated herein by reference in its entirety. In some embodiments, other lubrication systems or techniques, such as splash lubrication, may also be utilized.

Figure 8:
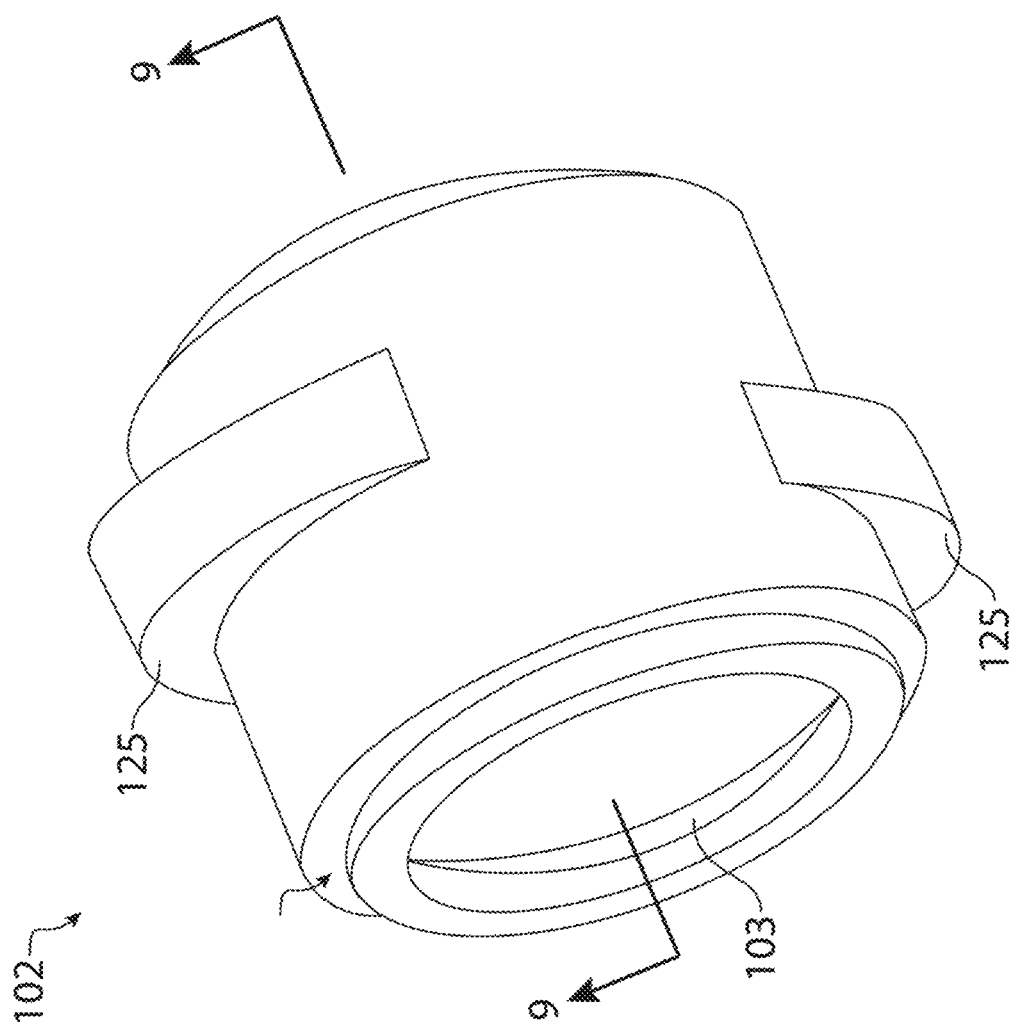
FIG. 8 is a perspective view of the crankshaft in the actuator of FIG. 2 showing the centerline thereof. The crankshaft contains two eccentric lobes which are 180° out-of-phase.

Referring again to FIG. 2, during operation of the actuator 101, the output attachment ring gear 135 rotates about the midline 123 of the actuator. Similarly, the parallel eccentric gears 131 are driven by the eccentrics 125 in a direction parallel to the midline 123 of the actuator 101 by the rotation of the rotor 103. The motion of the eccentrics 125 that accompanies the rotation of the rotor 103 may be appreciated from the 3-dimensional profile of the eccentrics 125 as seen in FIG. 8.

Figure 3:
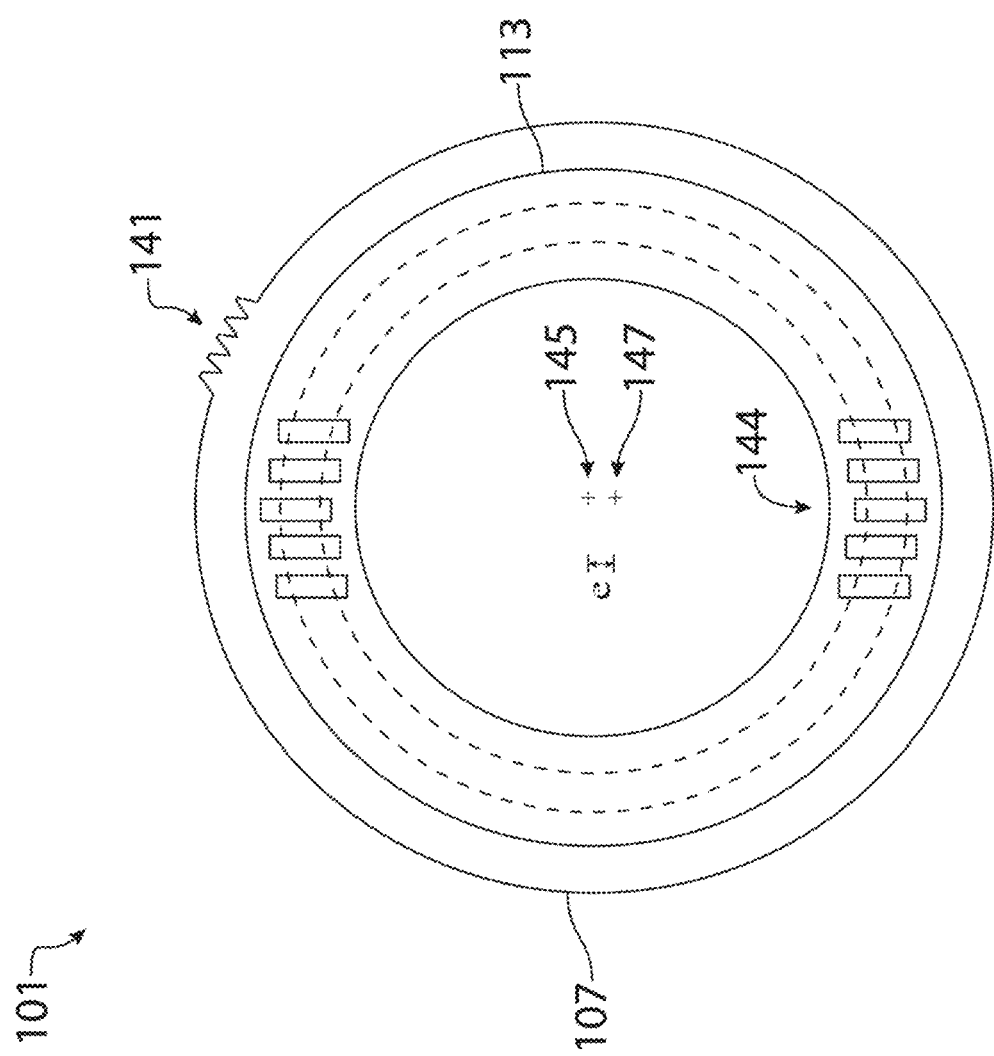
FIG. 3 is a front view of a parallel eccentric gear from the actuator of FIG. 2. The parallel eccentric gears are equipped with circular arc gear teeth, only a portion of which are shown.
Figure 4:
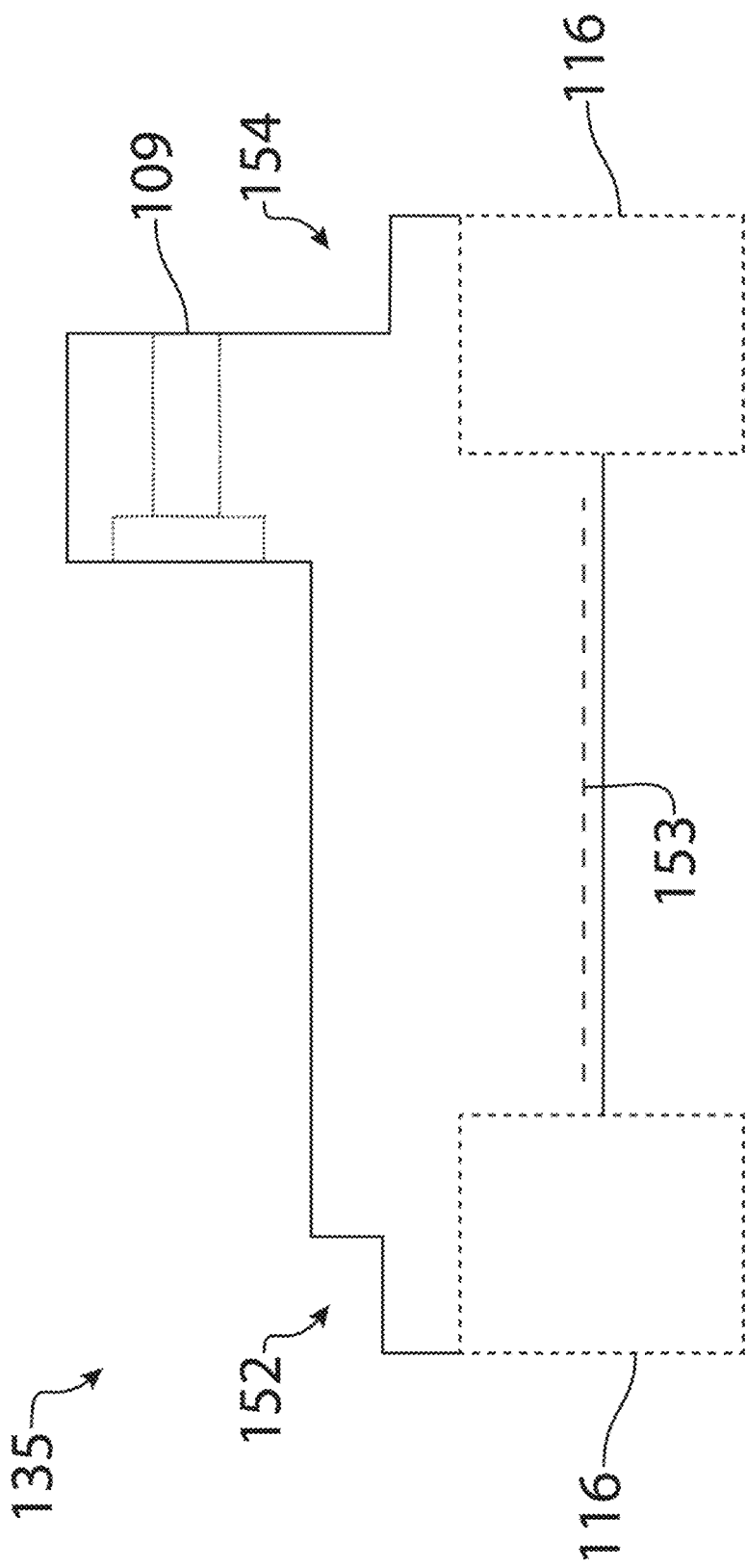
FIG. 4 is a cross-sectional illustration of one of the output internal gears utilized in the actuator of FIG. 2.

The geometry of the parallel eccentric gears 131 may be appreciated with respect to FIG. 3. In the particular embodiment depicted, the actuator includes two identical parallel eccentric gears 131, each of which is equipped with external teeth 141 (for simplicity of illustration, only a portion of the external teeth 141 are actually depicted). The external teeth 141 are preferably circular arc gear teeth. Such gear teeth have a very high load-carrying capacity with many additional desirable attributes, thus enabling several useful configurations of the resulting actuators. See, for example, U.S. Ser. No. 14/732,286 (Tesar), filed on Jun. 5, 2015 and entitled "Modified Parallel Eccentric Rotary Actuator", which is incorporated herein by reference in its entirety; and in U.S. Ser. No. 14/869,994 (Tesar), filed on Sep. 29, 2015 and entitled "Compact Parallel Eccentric Rotary Actuator", which is also incorporated herein by reference in its entirety.

Each eccentric gear 131 is equipped with a set of grooves 144 therein which engage the tongues 143 (see FIGS. 6-7) of the crosslinks 113, thereby driving the load and preventing the eccentric gear 131 from rotating. Because the eccentric gears 131 are positioned adjacent to each other, the forces are self-contained. This positioning of the eccentric gears 131 also allows for a reduction in the dimensions of the actuator 101. In particular, this feature causes the actuator 101 to be shorter and not as wide, and may allow the size balancing to approach ideal values, and yielding high values for torque density.

As seen in FIG. 3, the center 145 of the axis of rotation of the two eccentrics 125 is the same, and is slightly offset (by a distance e) from the center 147 of the crankshaft (here it is to be noted that the center 147 of the crankshaft is also the center of the gear train). The preferred value for the magnitude of e may be driven by various factors, although the height of the gear teeth is typically a significant (if not the major) consideration.

Figure 5:
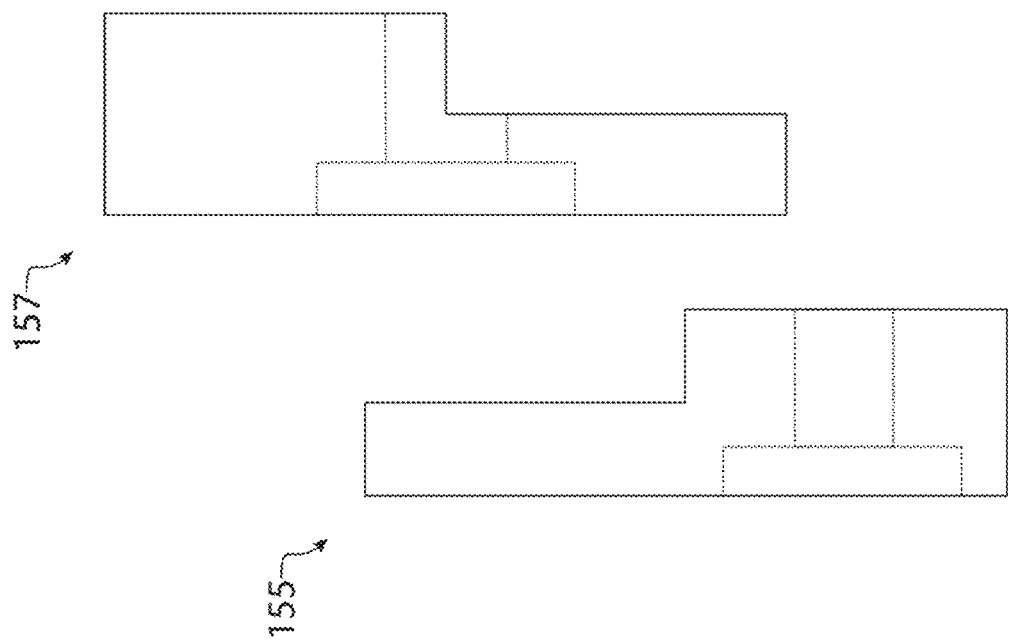
FIG. 5 is a set of conceptual illustrations depicting small and large diameter bearing clamps which may be utilized in the actuator of FIG. 2.

FIG. 5 is a set of conceptual illustrations of bearing clamps 155, 157. These bearing clamps 155, 157, which are not depicted in FIG. 2, serve to hold the inner races of their respective bearings rigidly in their respective bearing seats. Thus, the bearing clamps 155, 157 may be utilized to rigidly hold the inner race of principal bearings 115 (see FIG. 2) in bearing seats 116 (see FIG. 4). It will be appreciated that the shape and dimensions of the bearing clamps 155, 157 may vary considerably in any given implementation of the actuators described herein due, for example, to end use design constraints or tolerances or the geometry or configuration of the host device.

Figure 7:
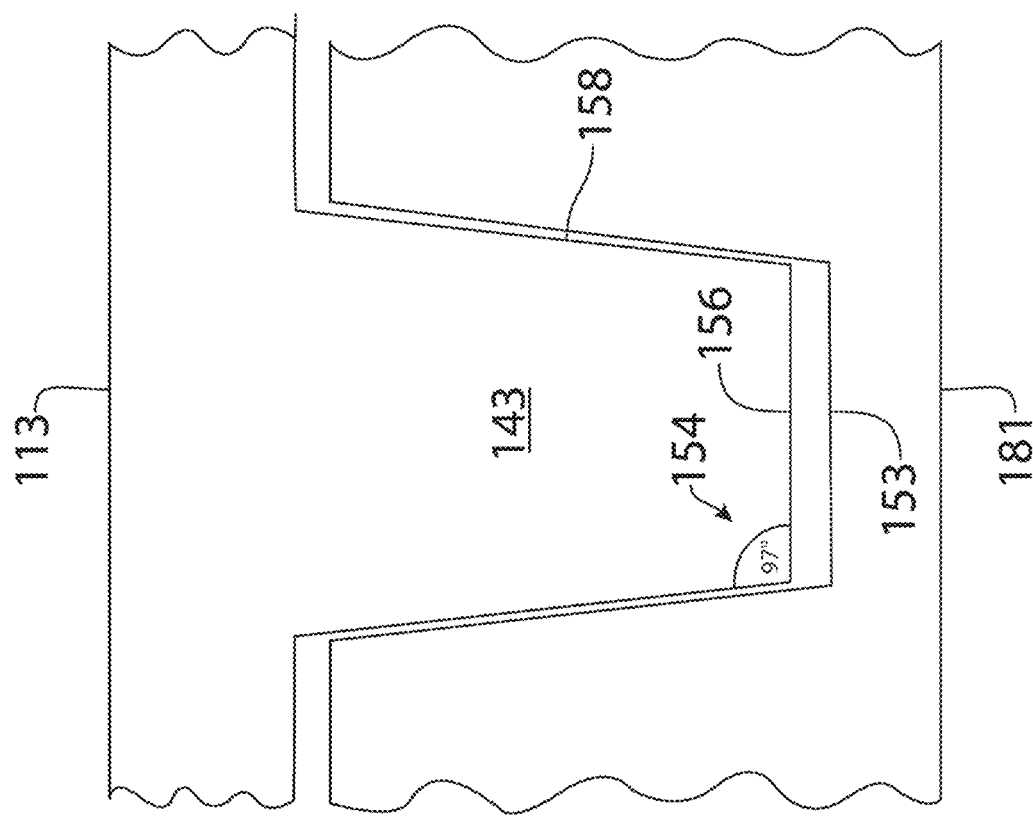
FIG. 7 is an enlarged view of a portion of the wedge mesh between the tongues on the crosslink and the corresponding grooves on a substrate in the actuator of FIG. 2. The substrate may be either an eccentric gear or an endplate.

FIG. 7 depicts a preferred geometry for the tongue and groove mesh which occurs between the tongues 143 on the crosslinks 113, and the grooves 153 on generic substrate 181, the latter of which may be either an eccentric gear 131 or an endplate 107. As seen therein, the distal surface 156 and the sidewall 158 of the tongue 143 are preferably flat and intersect at an angle θ. Typically, θ is in the range of 92° to 100°, preferably in the range of 93° to 99°, more preferably in the range of 95° to 99°, and most preferably is about 97°. The foregoing angle may also be expressed by its deviation (in degrees) from normality given by EQUATION 1:

$$\varnothing = \theta - 90 \qquad \text{(EQUATION 1)}$$

where Ø is thus typically in the range of 2° to 10°, preferably in the range of 3° to 9°, more preferably in the range of 5° to 9°, and most preferably is about 7°. The factors that will drive the choice of Ø or θ in a given implementation may include the effect of these angles on lubrication and the tendency of the resulting mesh to lock up (e.g., as a result of the force in a direction perpendicular to the centerline of the tongue 143 becoming too large) or to slip (e.g., as a result of the force in a direction parallel to the centerline of the tongue 143 becoming too large).

Figure 10:
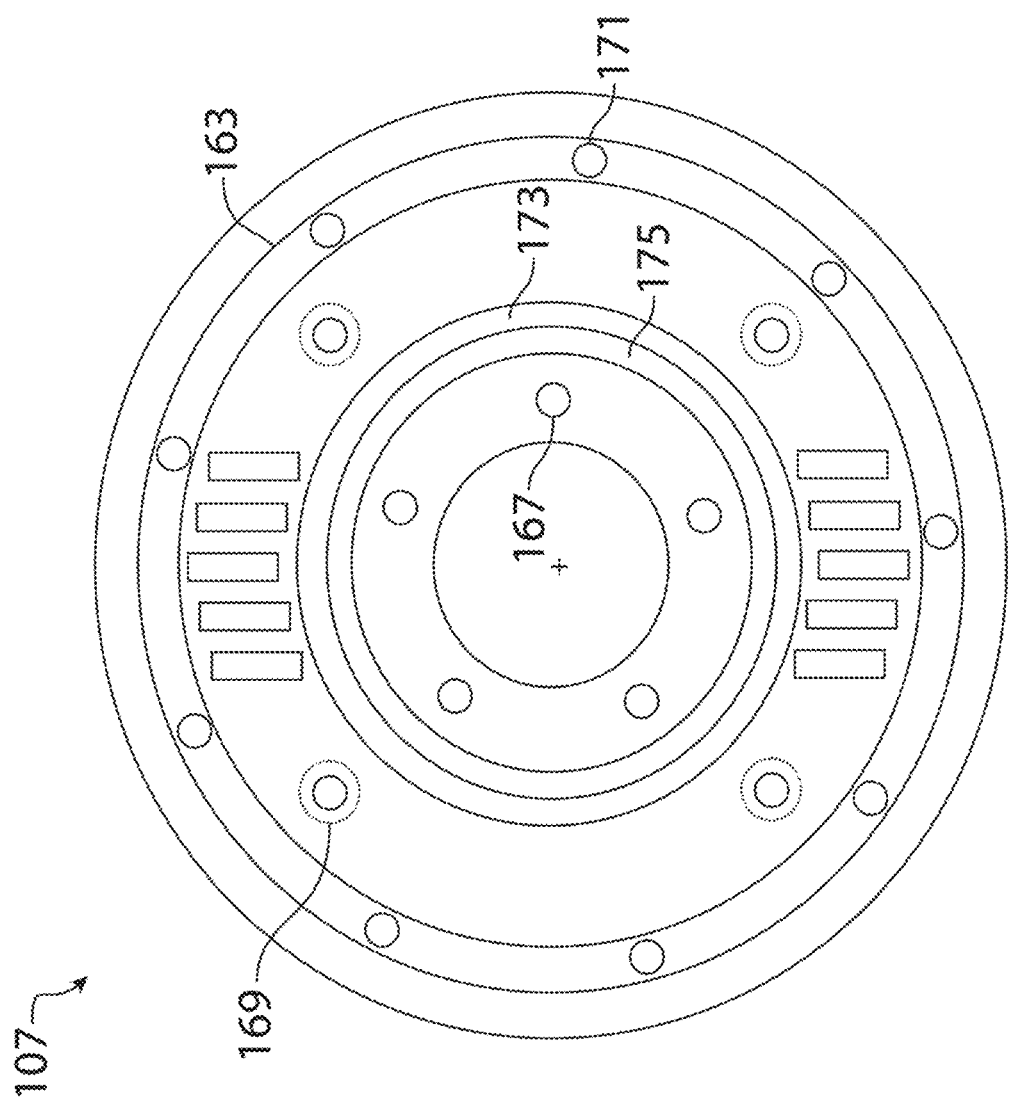
FIG. 10 is a front view of one of the endplates utilized in the actuator of FIG. 2. The endplates impart higher structural integrity to the actuator.

FIG. 10 depicts the construction of the parallel endplates 107, which impart significant structural integrity to the actuator 101. These endplates 107 feature sets of parallel rotor bearing grooves 173, 175 which are defined in opposing relation to each other in the face of the endplates 107, and which carry the load. The endplates 107 are further equipped with several sets of apertures for the fasteners used to assemble the device. These include openings 167 for the stator bolts 127, openings 169 for the external attachment bolts (to attach the actuator to external surfaces such as those of a host device) and openings 171 for the reference lugs 121.

Figure 9:
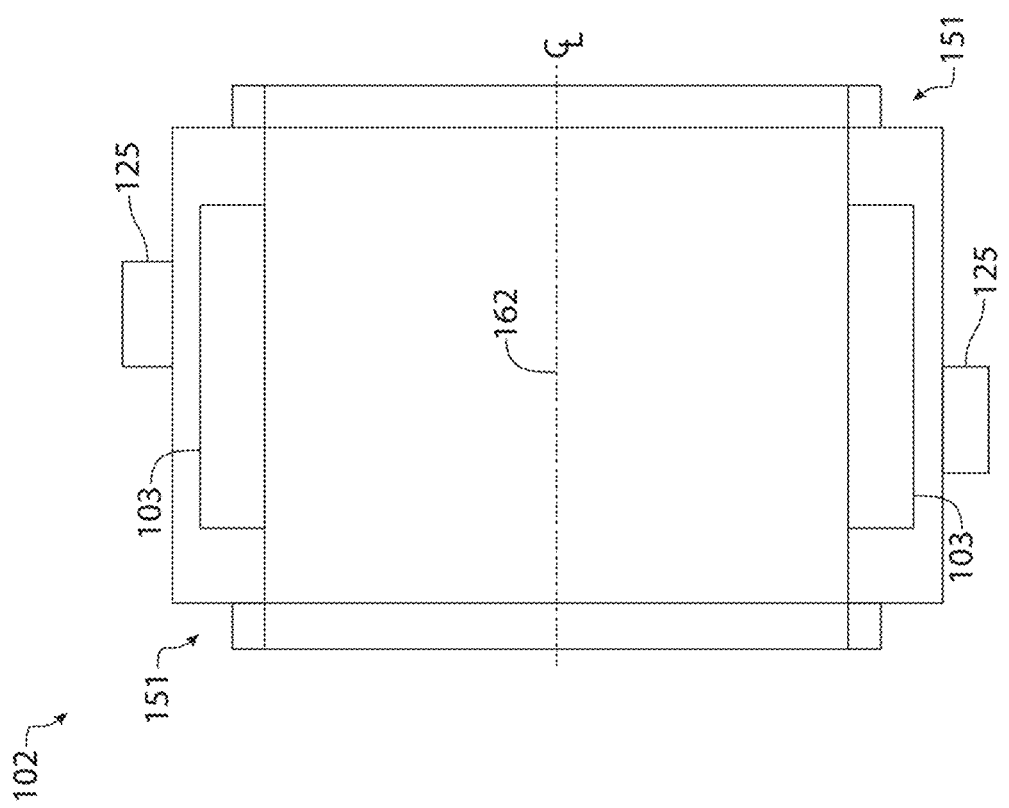
FIG. 9 is a cross-sectional view of the crankshaft of FIG. 8, taken along LINE 9-9 of FIG. 8.

The simplicity of the design of the actuator 101 of FIG. 1 may be appreciated with respect to FIGS. 8-9. As seen therein, the actuator 101 is equipped with a single crankshaft 102. By comparison, some earlier parallel eccentric actuators have featured three or more crankshafts. Moreover, the crankshaft 102 has a single rotational axis of symmetry in a direction perpendicular to centerline 162 (although the crankshaft is highly symmetric if the eccentrics 125 are disregarded), and the components of the crankshaft 102 (in particular, the stators 105, endplates 107, eccentric gears 131, eccentric gear bearings 117, rotor bearings 119 and principal bearings 115) are all interchangeable.

In addition, the rotor 103 and associated eccentrics 125 have an extremely rigid, monolithic construction with a simple geometry. Moreover, both ends of the endplates 107 are parallel and may be brought together simultaneously during assembly, and the bearings utilized in the actuator 101 (which includes the bearings 115, 117 and 119; see FIG. 2) may be readily mounted by simply sliding them into predefined bearing seats (such as, for example, the bearing seats 151 for rotor bearings 119). As seen in FIG. 10, all of the fasteners utilized in the device are arranged concentrically, which simplifies manufacturing. Finally, none of the components of the actuator require complex machining. These features help to make the resulting actuator easy and inexpensive to manufacture and assemble compared to prior art actuators.

Figure 23:
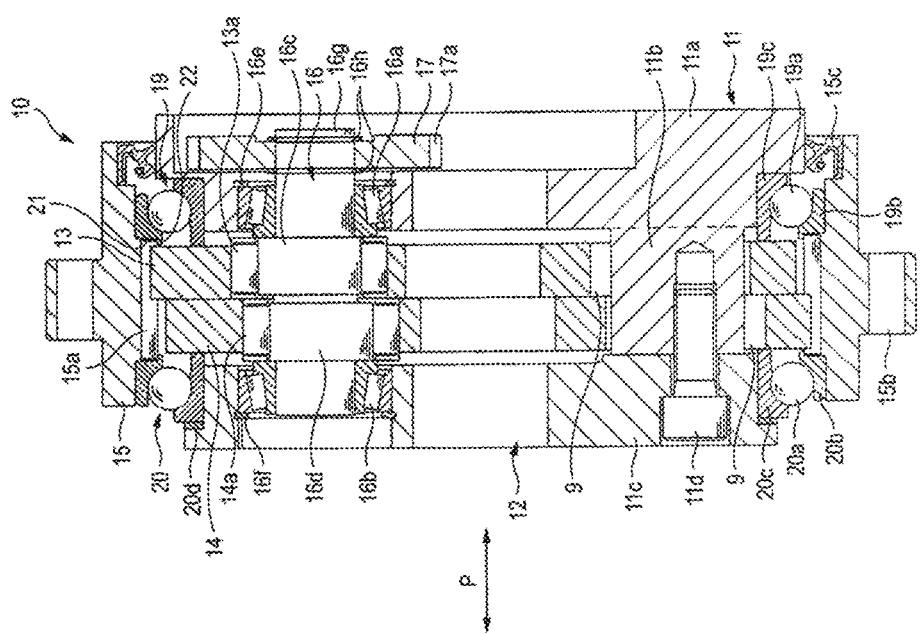
FIG. 23-25 are illustrations of a prior art Nabtesco gear train.
Figure 24:
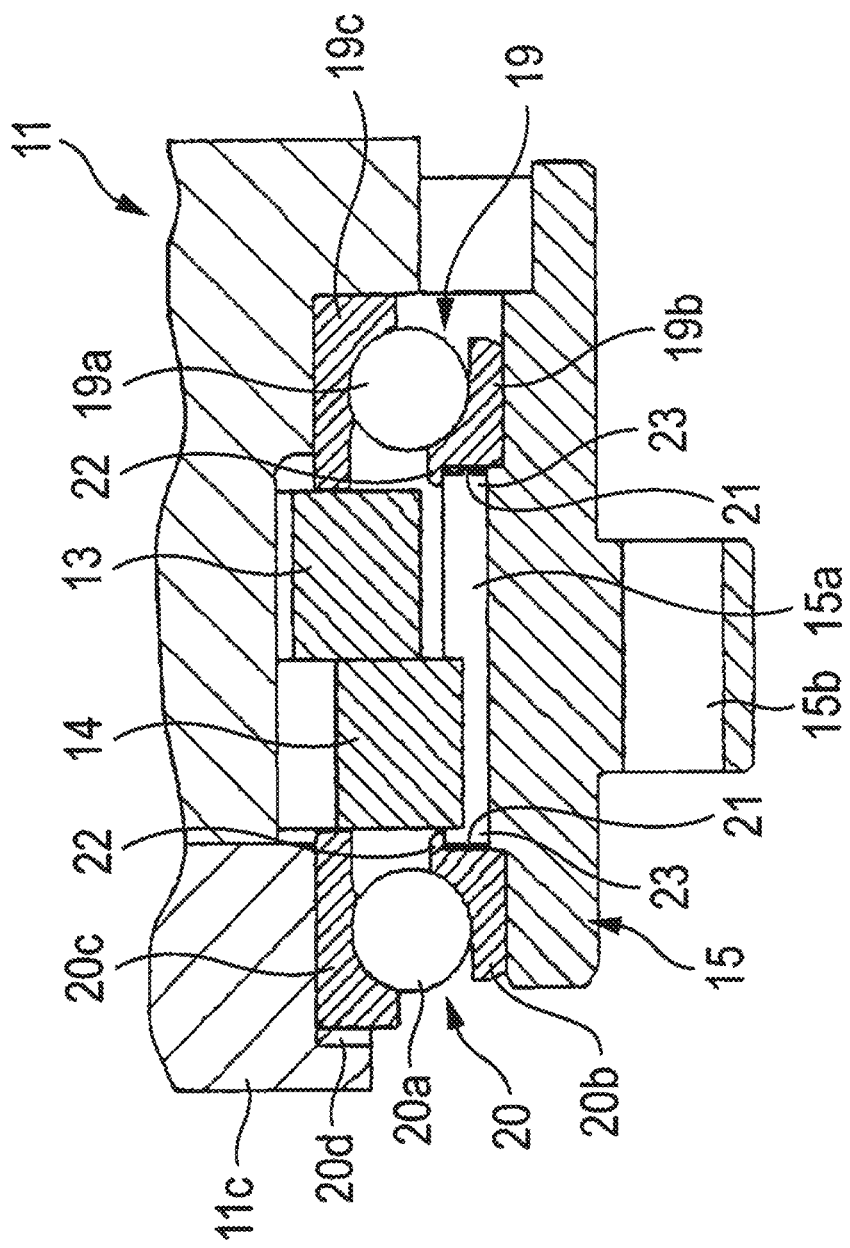
Figure 25:
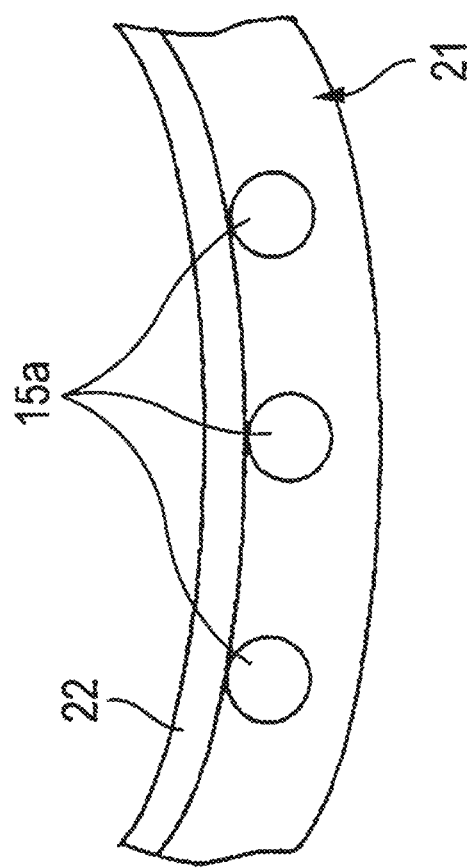

The pressure on the eccentric bearing 117 is approximately 5-10% of the pressure frequently experienced on the eccentric bearings of prior art parallel eccentric actuators of the type noted in FIGS. 23-24. These prior art actuators typically have 3 crankshafts, with 4 bearings each, and the load on the bearings is essentially 100% of the load at the output. By contrast, the preferred embodiment of the parallel eccentric actuators described herein may exhibit greatly reduced load, since there is no pressure angle pushing down on the crankshaft (this is because the pressure angle is about 7° as a result of the use of circular arc gear teeth). It is notable that none of the three sets of bearings (the rotor bearings 119, and eccentric gear bearings 117 and the principal bearings 115) in the simplified parallel eccentric actuator 101 of FIG. 2 lie within the primary force path of the device. Indeed, the primary source of load on the eccentric bearings 117 (which, as noted above, is greatly reduced in comparison to some prior art devices) arises from the aforementioned low pressure angle at the circular arc gear teeth. Hence, none of these three sets of bearings are heavily loaded, which also results in low internal deformations The embodiment of the parallel eccentric actuator 101 depicted in FIG. 2 has a pancake configuration of unusual simplicity. This actuator 101 combines an external rotor 103 and an internal stator 105 to directly drive a large (open) diameter crankshaft 102. The crankshaft 102 features two eccentrics 125 with only two lightly loaded crankshaft bearings 119 (here, it is noted that there are actually four bearings in the crankshaft 102, but only two of them support the crankshaft 102) and two widely spaced principal bearings 115 to carry all external loads on the actuator, thus allowing the actuator 101 to function as a machine joint. The motor stator 105 acts as the backbone of the actuator 101, tying the two parallel endplates 107 rigidly together. The endplates 107 are then cross-braced at their periphery with large diameter principal bearings 115 (which are preferably cross roller bearings, but may also be grooved roller bearings). The output attachment ring gear 135 is driven by the parallel eccentric gears 131 (operating 180° out of phase) which mesh with the output attachment ring gear 135 by way of the internal gear mesh 111.

The rotor 103 is supported by two lightly loaded end bearings 119 in the side plates 107, which drive the crankshaft (which is rigidly attached to the rotor 103). The drive shaft contains the two eccentrics 125 with rolling element bearings 117 (also lightly loaded) to drive the parallel eccentric gears 131. The crosslinks 113 then constrain the eccentric gears 131 to oscillate without rotation (in an Oldham kinematic geometry) by sets of crosslink tongues 143 (see FIG. 6) which, as noted above, interface with corresponding grooves 153 in the eccentric gears 131 and endplates 107. These grooves also carry the primary load with a large radial moment arm. Due to the large circumferences of these crosslinks, numerous tongue/grooves will be available to carry the load with relatively low contact pressures. As previously noted, a flat wave spring could be inserted between the eccentric gears to create a preload force on the crosslinks in order to take out all free space between the tapered tongues 143 and grooves 153.

The result of the foregoing construction is an unusually simple compact actuator of very high torque density and ruggedness. The reduction ratio for the actuator may go from 20 up to 150-to-1. The rotor may rotate at 5000 RPM or greater, resulting in an output ed of 250 RPM down to 33 RPM. It is to be noted that larger reduction ratios are unlikely. Nonetheless, the actuators described herein represent some very unique features that could prove useful in special applications.

Figure 11:
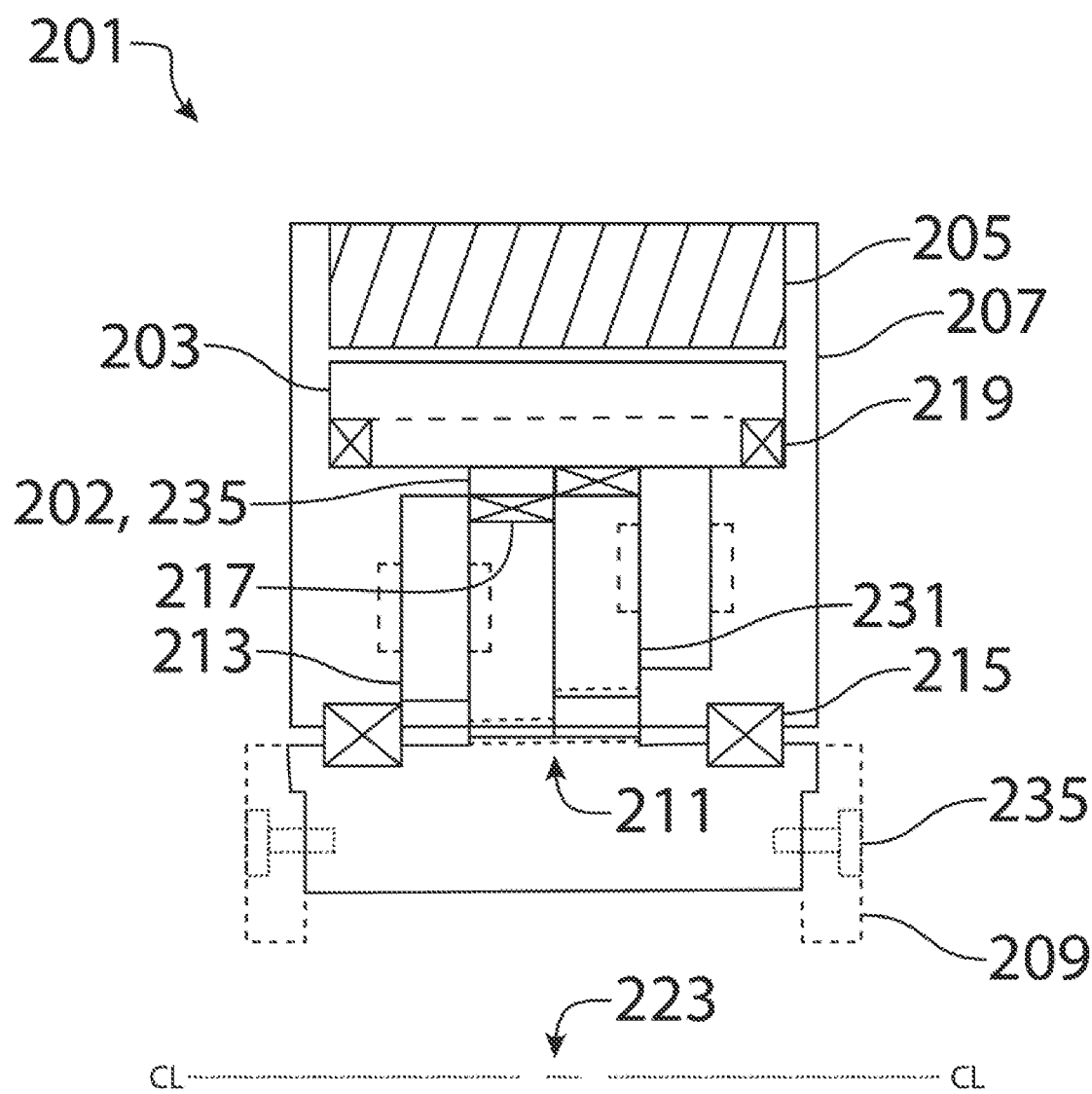
FIG. 11 is a cross-sectional view of a second embodiment of a simplified parallel eccentric actuator in accordance with the teachings herein which has an external prime mover whose rotor drives an internal crankshaft for the dual internal parallel gears meshed with the output external gear. This design utilizes minimum bearings and provides high power density.
Figure 12:
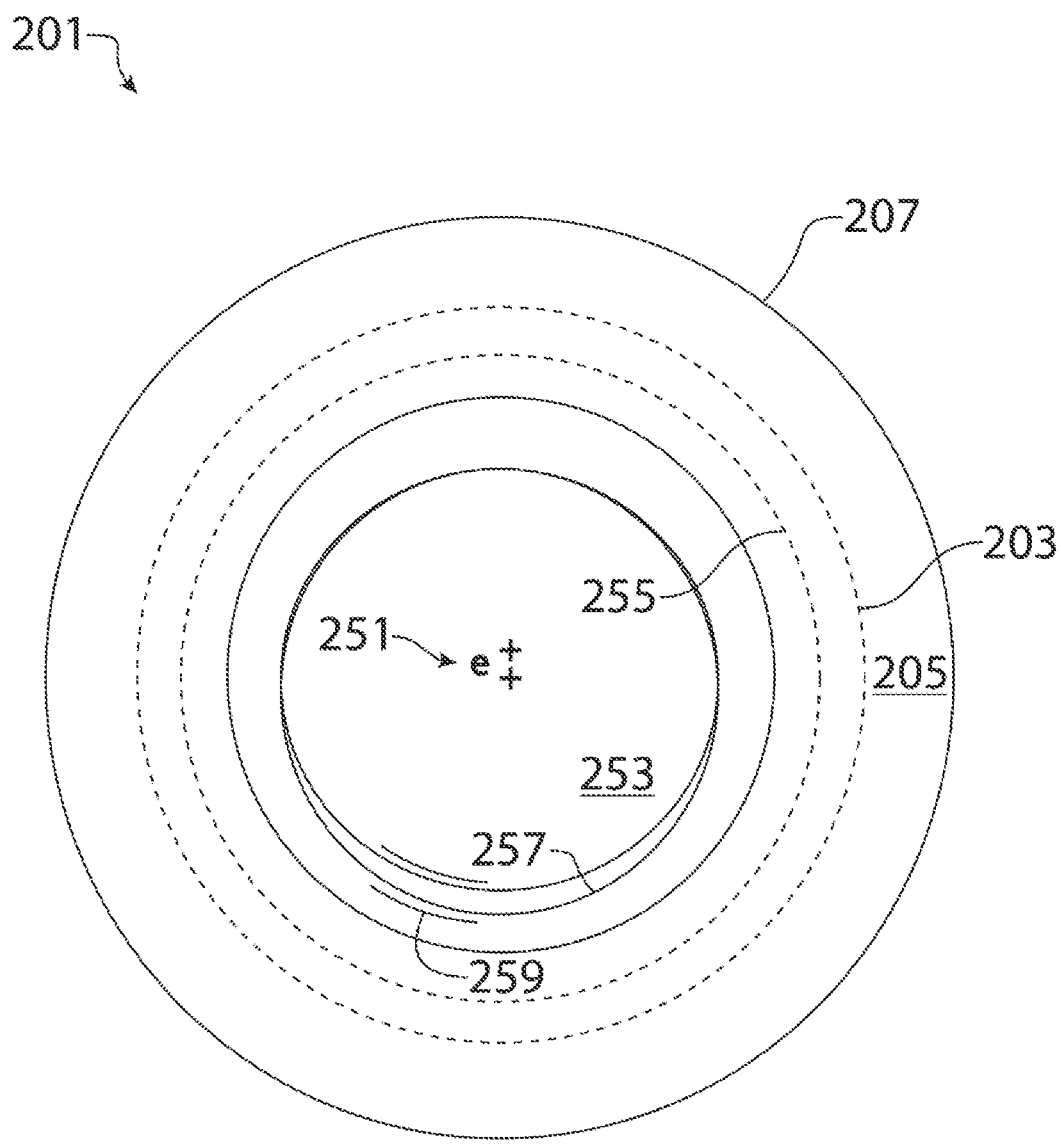
FIG. 12 is a cross-sectional view of the embodiment of FIG. 11 depicting the parallel eccentric gears thereof.
Figure 13:
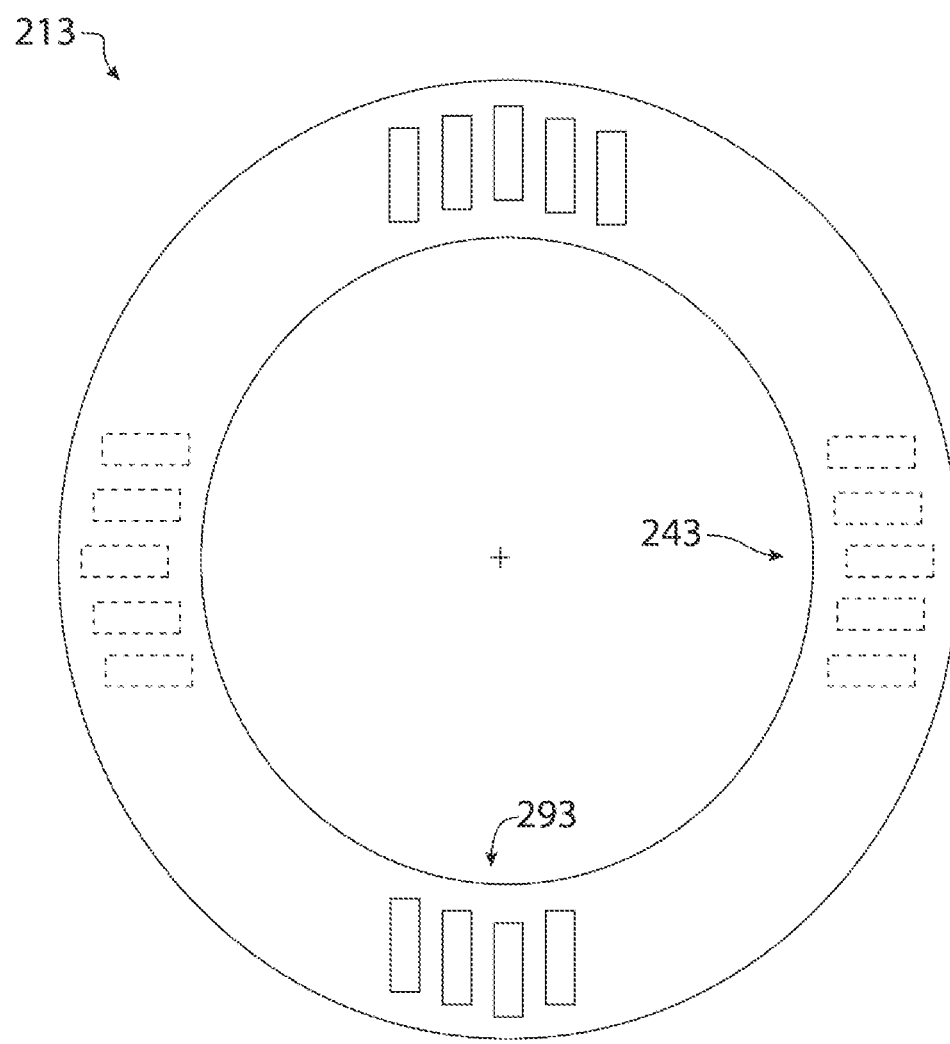
FIG. 13 is a front view of one of the crosslinks utilized in the actuator of FIG. 11. The crosslink is equipped with opposing sets of tongues disposed on first and second major surfaces of the crosslink. Each set of tongues on one surface of the crosslink is rotationally disposed by 90° from the sets of tongues disposed on the opposing surface of the crosslink.

In some embodiments of the actuators disclosed herein, it may be desirable to position the prime mover external to the parallel eccentric reducer. A particular, non-limiting embodiment of such an actuator is depicted in FIGS. 11-13. This actuator, which may be termed an External Parallel Eccentric (EPE) actuator, has a configuration which is highly conducive to thermal management of the stator, and which permits the use of the outstanding grooved roller bearing to support the central output shaft of the actuator. This configuration also maintains the simplicity and compactness of the simplified parallel eccentric actuator of the first embodiment described above. Embodiments of this actuator in a larger diameter pancake configuration with a large empty output screw shaft are especially preferred. The actuator of FIGS. 11-13 will typically be a, actuator of high power density, in contrast to the actuator summarized in FIG. 1 which is typically a high torque density actuator.

With reference to FIG. 11, the particular embodiment of the EPE rotary actuator 201 depicted therein comprises a rotor 203 and stator 205 which are disposed between parallel endplates 207, and which rotatingly drive an output attachment ring gear 235 across a gear mesh 211. The output attachment ring gear 235 is centrally disposed around, and rotates about, the centerline 223 of the actuator 201. The stiffness of the actuator 201 is assured through the use of crosslinks 213 (see FIG. 13). The actuator 201 utilizes principal bearings 215, eccentric gear bearings 217 and rotor bearings 219. A reference lug attachment 209 is provided on rotating output attachment ring gear 235.

Still referring to FIG. 11, the actuator 201 is equipped with two endplates 207 which hold the stator 205 in a stationary (and preferably rigid) fashion in an external position thereto. The endplates 207 are equipped with suitable depressions to hold the principal bearings 215. The principal bearings 215, in turn, support the output attachment ring gear 235, which has an external gear mesh 211 with the internal parallel eccentric gears 231. This configuration results in the formation of a shell which is bound together with the two principal bearings 215, the external gear mesh 211 of the output attachment ring gear 235, and the endplates 207. The endplates 207 are held together with the stator 205, thus rigidizing the structure.

The stator 205 drives the rotor 203, which rotates (in a direction perpendicular to the page in FIG. 11) on two bearings 219. These bearings 219, which are preferably ball bearings, are disposed on either side of the rotor 203. Notably, these lightly loaded bearings 219 are positioned on the outside of the rotor 203. The crankshaft 202 is attached rigidly to the rotor 203. The rotor 203 has two drive eccentrics 225, each of which carries an eccentric bearing 217. The eccentric bearings 217 are preferably needle bearings.

The two parallel eccentric gears 231 are positioned immediately below the eccentric gear bearings 217 and in a side-by-side arrangement. Preferably, a (typically cylindrical) wave spring is placed between the eccentric gears 231 and/or the eccentric gear bearings 217, and the parallel eccentric gears 231, the rotor 203, or both may be notched to accommodate the wave spring. This arrangement pushes the eccentric gear bearings 217 away from each other and against the wedge in the crosslinks 213, thus preloading the crosslinks 213. The eccentric offset 251 created by this arrangement may be appreciated with respect to FIG. 12, which depicts the relative arrangement of the eccentric 253, the internal eccentric 255, the external eccentric 257, the meshing teeth 259, the rotor 203, the stator 205 and the actuator shell 207.

As seen in FIG. 13, each of the crosslinks 213 has a first major surface with opposing sets of tongues 243 disposed thereon, and a second major surface which also has opposing sets of tongues 243 disposed thereon. Moreover, each set of tongues on each major surface of each crosslink 213 is rotated 90° with respect to the sets of tongues 243 on the opposing major surface of the crosslink 213. The sets of tongues 243 are depicted in dashed lines in FIG. 13, from which it may be appreciated that the sets of tongues 243 on a first major surface of each crosslink 113 engage a complimentary set of grooves disposed in the adjacent surface of the adjacent eccentric gear 231, and the sets of tongues 243 on the opposing second major surface of each crosslink 213 engage a complimentary set of grooves disposed in the adjacent surface of the adjacent endplate 207.

As noted above, the Simplified Parallel Eccentric (SPE) actuator 101 summarized in FIG. 1 uses an internal prime mover whose fixed stator 105 drives a rotor 103. The rotor 103, in turn, drives a crankshaft with two eccentrics 131, which drive two parallel eccentric circular arc gears, which drive the external output shell (of large diameter). On desirable attribute of the SPE is that it represents only six rolling element bearings, none of which are in the load path.

In comparison to the SPE, the EPE reverses the foregoing sequence, but uses the same principles. In particular, in the EPE actuator 201 of FIG. 11, the external stator 205 is fixed to the system reference. It drives the rotor 203 supported by two simple lightly loaded bearings 219. The rotor 203 carries the crankshaft which uses two internal eccentrics 231 (preferably using needle bearings 217) to drive the two parallel eccentric gears 131 180° out of phase. These PE gears 131 have internal circular arc teeth which, then, drive the output shaft containing the external circular arc teeth. Finally, the output shaft is supported either by simple tapered roller bearings or by the exceptional grooved roller bearings, depending on the external load properties faced by this actuator 201. The grooved roller bearings are capable of exceptional load capacity in all six directions, especially along the center line of the EPE.

In a preferred embodiment, the EPE actuator 201 is desirable due to the unique and simple component arrangement it affords. The primary function of the prime mover and gear reducer is to create torque on the output shaft. It does this by driving two internal parallel eccentric gears 131 which mesh with the external gear on the output shaft. As a result of this layout, the diameters of these internal gears are about 50% of their counterparts in the SPE, which means that their effective torque capacity is reduced by 50%. This reduction in torque capacity may be mitigated, if desired, by increasing the width of the EPE gears such that they are twice as wide as their counterparts in the SPE.

The crosslinks are equally loaded in both the SPE and the EPE. These crosslinks preferably use tongue/groove splines in the load path, which oscillate in short strokes at the cyclic rate of the rotor. The sliding contact loads necessarily result in higher friction than equivalent rolling element bearings (for example, 5% versus 1%).

The EPE is typically best suited for use under a power class duty cycle as found in construction machinery, and is typically less well suited for use in power class duty cycles such as those found in high cyclic rates for industrial robots. The EPE is ideal for use in pancake geometry spaces. Its external stator may be readily cooled even under severe duty cycles. It is preferably used where peak torques are not much more than their designed (root-mean-square) torque levels (i.e., a power duty cycle). The reduction ratio range would typically be from 50 to 150-to-1.

In some embodiments of the actuators and gear trains described herein, the EPE may be utilized as the front end of a versatile linear actuator for the EPE output shaft that would drive a 10-to-1 lead translating screw. In such embodiments, the total reduction may easily reach 1000-to-1. Such reductions enable very high load generation, and thus allow PEPs to be used to replace hydraulic actuators by plugging the EPE with the output screw directly into the existing drive system geometry.

Figure 14:
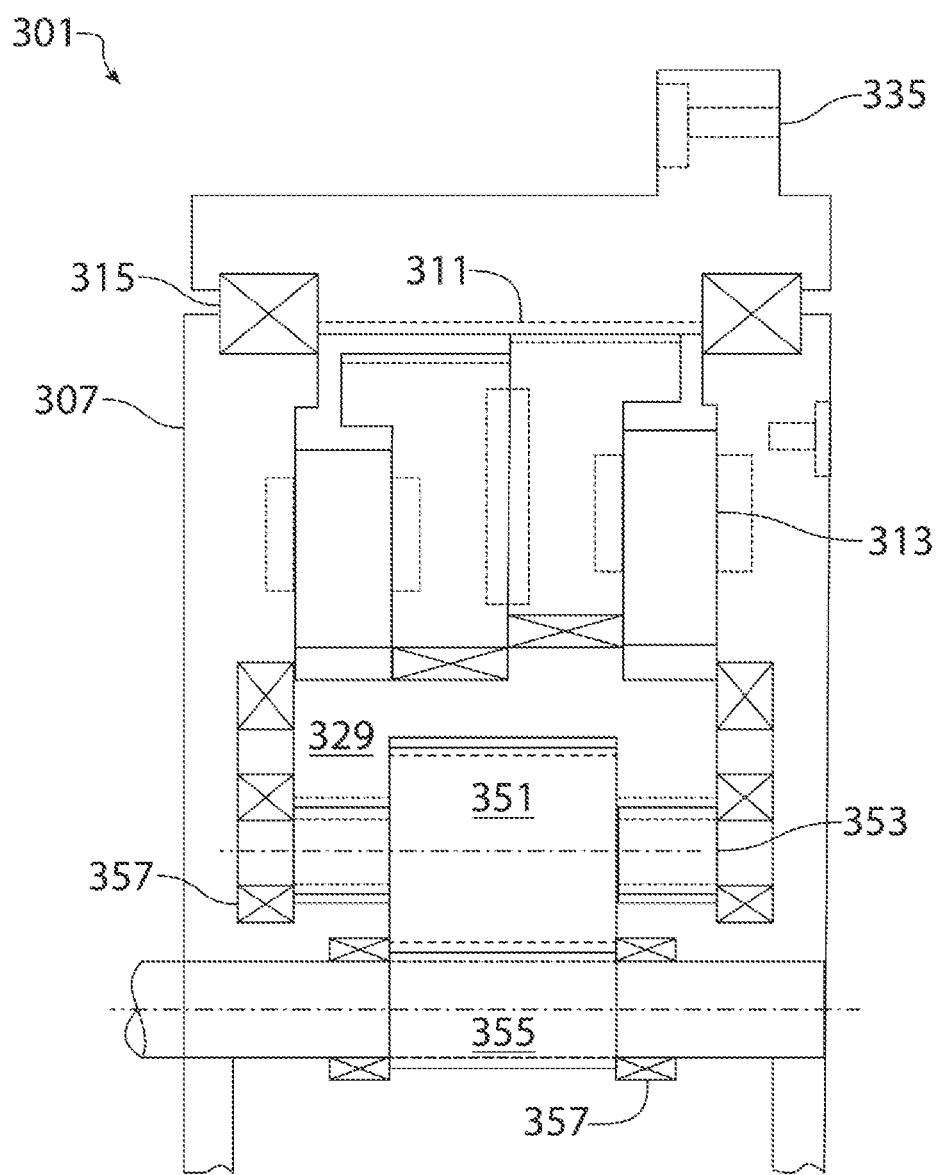
FIG. 14 is a cross-sectional view of a third embodiment of a simplified parallel eccentric actuator in accordance with the teachings herein which utilizes a star compound gear to drive a simplified parallel eccentric.

In addition to the goals stated above, it is also a goal of the present disclosure to provide an Electro-Mechanical Actuator (EMA) with an exceptional two-stage gear train to provide reduction ratios between 250-to-1 up to 4000-to-1. In order to achieve this objective, a symmetrical star compound gear train (10 to 20-to-1) may be utilized to drive a parallel eccentric gear pair (50 to 150-to-1) whose output internal gear is supported by grooved roller bearings of remarkable load capacity in both radial and thrust directions. The advantages of such a configuration may be further understood by considering the current state of the art (FIG. 14).

At present, rotary actuators completely dominate relative joint motions in industrial robots with duty cycles of approximately 1 cycle per second. These actuators are cost-effective, and provide high repeatability and a durability of 100,000 hours. Rotary actuators in industrial robots are required to operate continuously in force fights, must react to disturbances, and are required to carry heavy loads. Unfortunately, these actuators are typically unable to maintain an accurate position under varying loads. This is primarily due to their lack of stiffness, and is also due to the absence of any real-time compensation means through error measurement and fast corrective command signals. Most of these actuators require a 100-to-1 reducer for which the Simplified Parallel Eccentric (SPE) may be ideally suited.

The SPE is an extremely simple gear train structured to carry a heavy load in all directions. It may be driven either by an internal prime mover or by an external motor. The internal motor configuration of FIG. 2 has its rotor external to the stator and tied to the actuator frame. The rotor and the crankshaft in the preferred embodiment of that configuration consist of one rigid cylinder supported by two end bearings in the frame of the actuator. These bearings support relatively small crankshaft forces, and are not in the principal load path of the actuator.

The crankshaft in this configuration contains two eccentrics to drive (oscillate without rotation) two parallel eccentric gears. These parallel gears are 180° out of phase to cancel all inertia forces and to essentially cancel any dimensional errors due to manufacture. Each parallel gear is constrained by a cross link (two tongue and groove meshes—one set on each side of the cross link) which does not rotate as a result of its tongue and groove meshes with the external fixed frame of the actuator. This oscillation creates what is classically called hypocyclic motion.

Each parallel gear has external circular arc gear teeth which mesh with one internal output gear containing matching circular gear teeth. In general, the external gears would have 100 teeth each to mesh with 101 teeth on the internal gear to provide a 100-to-1 reduction. The circular arc gear teeth will have approximately 6 teeth carrying the load (3 on each gear) when it is larger the more load the more engaged teeth to make it self-protective). The concave/convex contact reduces contact stresses by 3 to 5×, the 6 teeth reduce local stresses by 3×, the shorter teeth (3× shorter than normal) reduce bending stresses by 5×, and so forth, to give a better than 100× increased load capacity over standard involute gear teeth.

Further, there are no rolling element bearings in the primary load path which are very compliant (but also very efficient) and require a lot of internal space in the gear train. By contrast, the output gear is supported by two extraordinary grooved roller bearings which are able to carry all loads (radial and thrust) in all directions. The capacity of these roller bearings exceeds that of tapered roller bearings by 15× and cross roller bearings by 3×. The loaded tongue and groove meshes oscillate in small strokes (0.25" to 0.4") at the speed of the prime mover, which results in some lubrication issues and a loss in efficiency.

The star compound gear train may be used as a reducer to drive the crankshaft of the SPE. One particular, non-limiting embodiment of an electromechanical actuator (EMA) having such a configuration is depicted in FIG. 14. As seen therein, the EMA 301 depicted therein comprises an output attachment plate 335 supported on principal bearings 315 which meshes with parallel eccentric gears 331 by way of an eccentric gear mesh 311, crosslinks 313, an eccentric crankshaft 329 and parallel endplates 307. These elements and their interoperation and function are the same as, or similar to, their counterparts in FIG. 2, and hence are not described in greater detail. In addition, the EMA 301 comprises a star gear 351, an amplifier gear 353, a sun gear 355, and support bearings 357.

Figure 15:
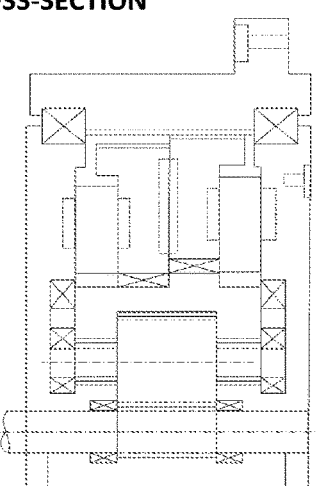
FIG. 15 is a listing of some of the features and benefits of the actuator of FIG. 14.

A star compound gear train is used as a reducer in the embodiment of FIG. 14 to drive the crankshaft of the SPE. The complete concentric symmetry of this gear train is built using 3 (+) star gears 351 supported by bearings 357 in the rigid shell of the actuator. This shell surrounds the input pinion, the latter of which is driven by an external prime mover. The reduction ratio may vary from 5 to 20-to-1, which multiplies the SPE ratio of 50 up to 200-to-1 to give a total feasible reduction range of 250 up to 4000-to-1 in an exceptionally small package (see FIG. 15).

In the configuration of FIG. 14, each star gear 351 is driven by the pinion. Each star gear 351 carries two amplifier gears 353 which are rigidly (and symmetrically) attached to the star gear shaft to drive the crankshaft cylinder of the SPE. The unique symmetry of the two amplifier gears 353 driving each end of the PE crankshaft eliminates cross-axis distortion, and ensures that the PE crankshaft bearings are nominally loaded (that is, not in the primary force path). This concentric symmetry is rare in gear reducers, but the SCPE benefits from this symmetry throughout its structure to help minimize all internal forces, and therefore internal deformations.

XVII. EMA Replacement of Hydraulic Actuators in Construction Machinery

A. Objective

It is a goal of the present disclosure to estimate essential electro-mechanical actuator (EMA) parameters to replace hydraulic actuators on large heavy-duty construction, handling, mining, and farm machinery. Preliminary analysis suggests a torque density of 330 ft-lb/lb. for rotary actuators based on a combination of a front-end simple star compound and a simplified parallel eccentric. This suggests a 2280 lb./120 h.p. actuator to manage peak torque levels up to 800,000 ft-lb. necessary for large commercial excavators Hydraulic Actuators (HAs) disappeared in 1980 for robot manipulators due to the demanding duty cycle and associated lack of availability (too much down time) in favor of EMAs, which today have a life durability exceeding 100,000 hours. Further, HAs tend to leak, demand specialized maintenance, and are 5× less efficient. The perception, however, is that only hydraulics can manage large forces, as exist in heavy duty excavators. This was given some attention for field handling systems (forestry, battlefield, warehousing, etc.) in FIG. 16 and TABLE 25, for designs where light, medium, and heavy duty systems (6 DOF manipulators, mobile platforms) of three scales are assembled from a minimum of 18 distinct EMAs (TABLE 24). These standardized EMA modules may be mass produced to achieve higher performance at lower cost and deliver unique benefits due to their electro-mechanical technology. Quick-change standardized interfaces may be utilized to enable rapid repair and refreshment (by plug-and-play) even in the field with minimum spares and nominally-trained technicians. Hence, life cycle cost goes down while availability goes up. Here, the question arises as to whether this may be achieved for high load/rugged/shock prevalent operations as associated with large excavators.

Figure 17:
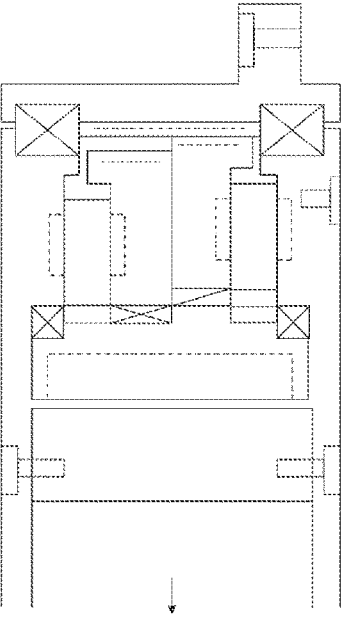
FIG. 17 is an illustration of some of the features and advantages of simplified parallel eccentric actuators.

The primary power level requirement is the output load (lb.) and velocity (in./sec.), which determines the level of power in the prime mover and its associated weight (here based on the continuous power density of 1 h.p./lb.). On the other hand, since the duty cycle on excavators is modest (peak force levels are infrequent), it is reasonable to design the prime movers based on their peak power density (2 h.p./lb.). It is difficult to compare the HA weight total, but if the weight of the hoses, pumps, hydraulic fluid reservoir, and other such components is included, the EMA weight is likely much less. There is also the question of life-cycle cost (for example, efficiency, durability, maintenance, and availability), which should be much more attractive for the EMA-based system. The initial cost of the EMAs is likely higher (perhaps by 2×), but their useful life cycle cost is expected to be 5× better (as represented by those used in industrial robots). As previously noted, it appears that the EMA tech base is competitive, but it is not clear that it is decisive until a carefully set-up, run-off evaluation is pursued (FIG. 17).

The example of a large excavator requires actuators to drive the scoop, stick and boom, which can reach 33 to 35 ft. in length. The required actuators operate in periods of 3 to 10 sec. over angular ranges of 120° to 135° (i.e., from 2 to 7 RPM). These systems experience significant shocks in low duty cycles. This means that significant stress margins must be maintained under peak load conditions. All of this requires major horsepower at prime mover torque levels, which could demand heavy front-end electric motors. Here, this reality is met by using a simple (single plane) 5-to-1 star compound gear train driving a remarkable 100-to-1 simplified parallel eccentric reducer to provide an overall reduction of 500-to-1.

Robotics has proven itself as a valid transport, repetitive function system in industry (note that larger industrial robots are no longer produced in the U.S.). These 6 DOF industrial manipulators are unusually low cost and now exhibit an endurance of 100,000 hours of demanding operation. To get beyond 5,000 hours, all hydraulics were removed by 1980. All linear actuators disappeared by 1990. Today, the three best gear trains for Electro-Mechanical Actuators (EMAs) are made by the Japanese. On the other hand, the Tesar program in robotics has been developing fully integrated electro-mechanical actuators for 40 years and exceeds best industrial practice by 4 orders of magnitude (recent prototype built under ONR funding). This development has shown that exceptional torque density is feasible (800 ft.-lb. in the 5" dia. 10 lb. package up to 1,000,000 ft-lb. in a 50" dia. 3000 lb. package). These EMAs may be used as standardized modules in an open architecture (assembled on demand) to form a wide range of medium-scale or heavy-duty robot manipulators (for example, 10,000 lb. capacity at 20 ft). This 40 year program has produced and commercialized a universal real-time operating software (OSCAR) for all scales of these manipulators, which enables 10 msec. reprogramability, human operator oversight, obstacle avoidance, power management, compensation for deflections, safety, general motion programming, and other desirable attributes.

It is proposed to assemble on demand a full consort of smaller-scale modular handling and transport systems for construction and battlefield operations (see FIG. 16). This would include dexterous 6 DOF medium scale manipulators and mobile platforms (for loads up to 1000 lbs.) and the equivalent heavy duty systems (for loads up to 10,000 lbs.). All these systems would be maintained by plug-and-play replacement of all modules by a nominally-trained technician. All these systems would be continuously refreshable to prevent obsolescence (even in the field). All these systems would be operated by one universal software (OSCAR) which also is open and completely refreshable. Each EMA would be operated at an exceptional level of intelligence using AMOS (Actuator Management Operation Software) now under development.

To achieve all of this, an in-depth development of 18 unique intelligent actuator modules is proposed (see TABLE 25):

TABLE 24

| Unique Intelligent Actuator Modules | |
| --- | --- |
| Class | No. Distinct Sizes |
| Medium Scale | 6 |
| Heavy Duty | 5 |
| Multi-Speed Wheels | 4 |
| Long-Arm Wheel Suspension | 3 |

This minimum set of actuators would be sufficient to build a very large population of handling and transport systems (TABLE 24). It further ensures exceptional performance characteristics because all design, testing, and production efforts are concentrated on a very few required subsystems. It also dramatically improves certification of durability and performance. This minimum set further means that larger numbers of each actuator may be produced to reduce cost while at the same time consistently improving performance.

The parallel eccentric gears with circular arc teeth have a very high load-carrying capacity with many additional attributes. This enables many useful configurations. Here, a pancake configuration of unusual simplicity is described which combines an external rotor (internal stator) to directly drive a large (open) diameter crankshaft with two eccentrics with only four lightly loaded crankshaft bearings and two widely spaced principal bearings to carry all external loads on this actuator acting as a machine joint (see FIG. 2).

These actuators are intended to manage ever-higher/more complex loading and duty cycles and be quickly responsive to command (contrary to the limitations existing in standard involute teeth gearing) as found, for example, in fighter aircraft in a dogfight, the drive of orthotic structures to enable stair climbing, or the independent wheel drives of off-terrain vehicles. These duty cycles demand intelligence to rapidly respond to a wide range of commands to utilize a high level of beneficial internal nonlinearity in the driving actuators.

To be effective, these actuators will not rely on the simple gear train technology of the past. Various characteristics, including no backlash, high torque density, high efficiency, reduced rolling element bearings, and high shock resistance, may become essential to meet the performance requirements of an ever-expanding range of applications (such as, for example, replacing hydraulics, improving responsiveness, minimizing weight, or reducing noise). FIG. 2 shows a remarkably simple pancake configuration for the parallel eccentric with only two principal (load carrying) bearings and 4 lightly loaded crankshaft bearings. The motor stator acts as the backbone of the actuator tying the two parallel end plates rigidly together. These end plates are then cross braced at their periphery with the large diameter principal bearings (preferably cross rollers). The output cylinder between the principal bearings is driven by the parallel eccentric gears (180° out of phase) meshed with the internal gear in the output cylinder. The external rotor is supported by two lightly loaded end bearings in the side plates, which then drive the crankshaft (rigidly attached to the rotor). The crankshaft contains two eccentrics with rolling element bearings (also lightly loaded) to drive the parallel eccentric gears. The cross links then constrain the gears to oscillate without rotation by sets of cross link tongues/grooves.

TABLE 25

Unique Intelligent Actuator Modules

| Heavy Duty | | | |
|---|---|---|---|
| Length (ft) | 20 | 10 | 5 |
| Load (lb) | 10,000 | 10,000 | 3,000 |
| Est. Weight (lb) | 10,000 | 3,600 | 1,550 |
| Load/Weight Ratio | 1 | 2.75 | 1.9 |
| Medium Duty | | | |
| Length (ft) | 20 | 10 | 5 |
| Load (lb) | 1,000 | 1,000 | 300 |
| Est. Weight (lb) | 1,100 | 500 | 216 |
| Load/Weight Ratio | 0.91 | 2.0 | 1.4 |
| Light Duty | | | |
| Length (ft) | 20 | 10 | 5 |
| Load (lb) | 300 | 300 | 150 |
| Est. Weight (lb) | 350 | 160 | 30 |
| Load/Weight Ratio | 0.85 | 1.85 | 5.0 |

In heavily loaded SPE applications (replacing hydraulics) operating at relatively low speeds, the tongue/grooves may experience high perpendicular loads leading to 10,000(+) psi contact pressure. Proper pressurized lubrication from crankshaft driven eccentric pumps may become necessary. Under very demanding loading on the parallel eccentric gears and the crosslinks, it may be desirable to have an additional crankshaft lobe drive a slider in the cross-link to assist its lateral motion against friction forces. Very little force at the crankshaft will be necessary to reduce cross coupling of these crosslink forces and moments. This eccentric will drive the outer tongue/groove motion (but not the inner set) by using a short stroke slide at the eccentric to permit free motion in one direction and drive the crosslink in the 90° to that direction. The benefits may be best measured under stringent testing conditions. In this expanded heavy duty SC/SPE, it would be very desirable to have webbed disks to reinforce their rigidity under heavy tongue/groove forces.

Figure 18:
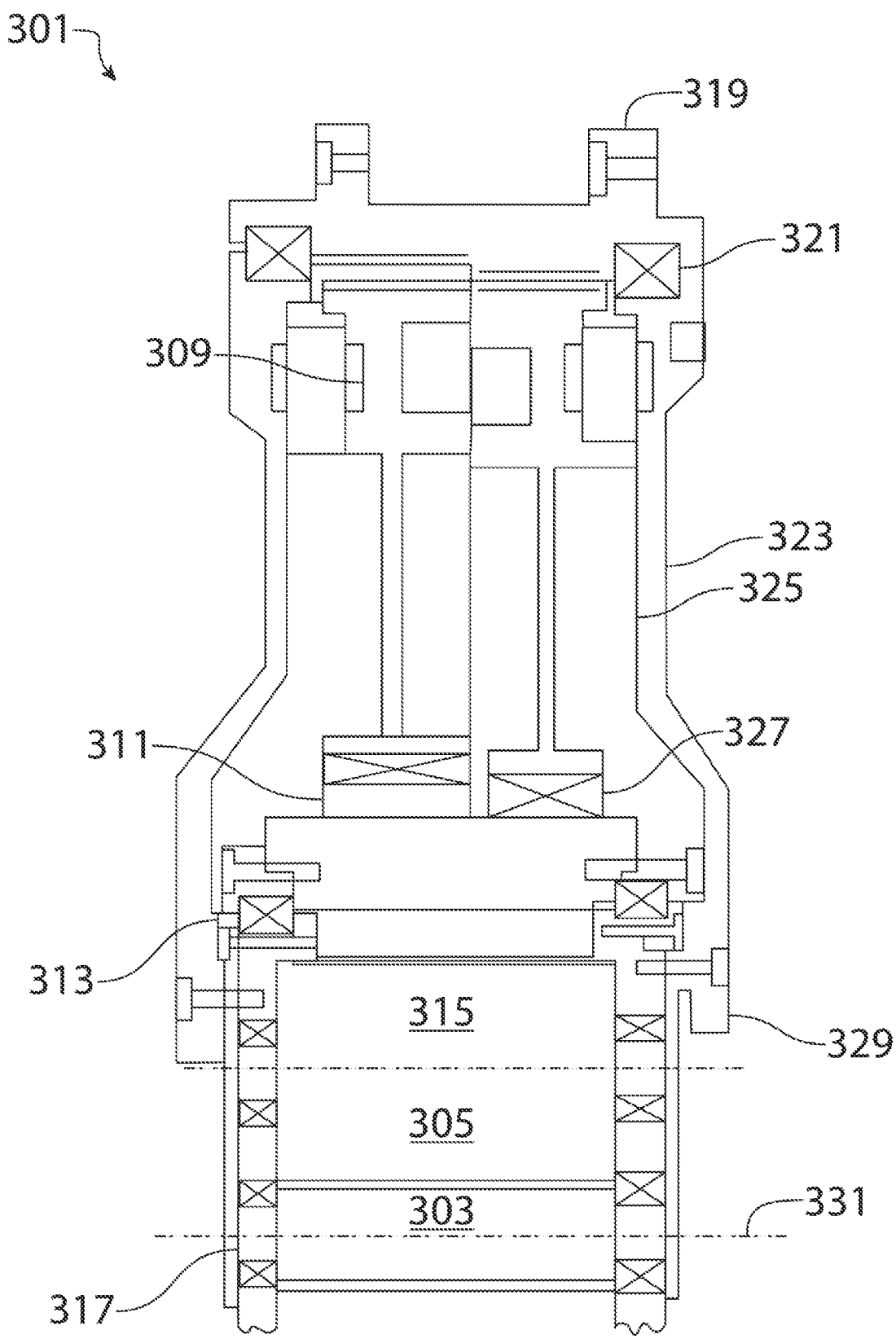
FIGS. 18-21 are illustrations of high load capacity actuators which are especially suitable for construction machines.
Figure 19:
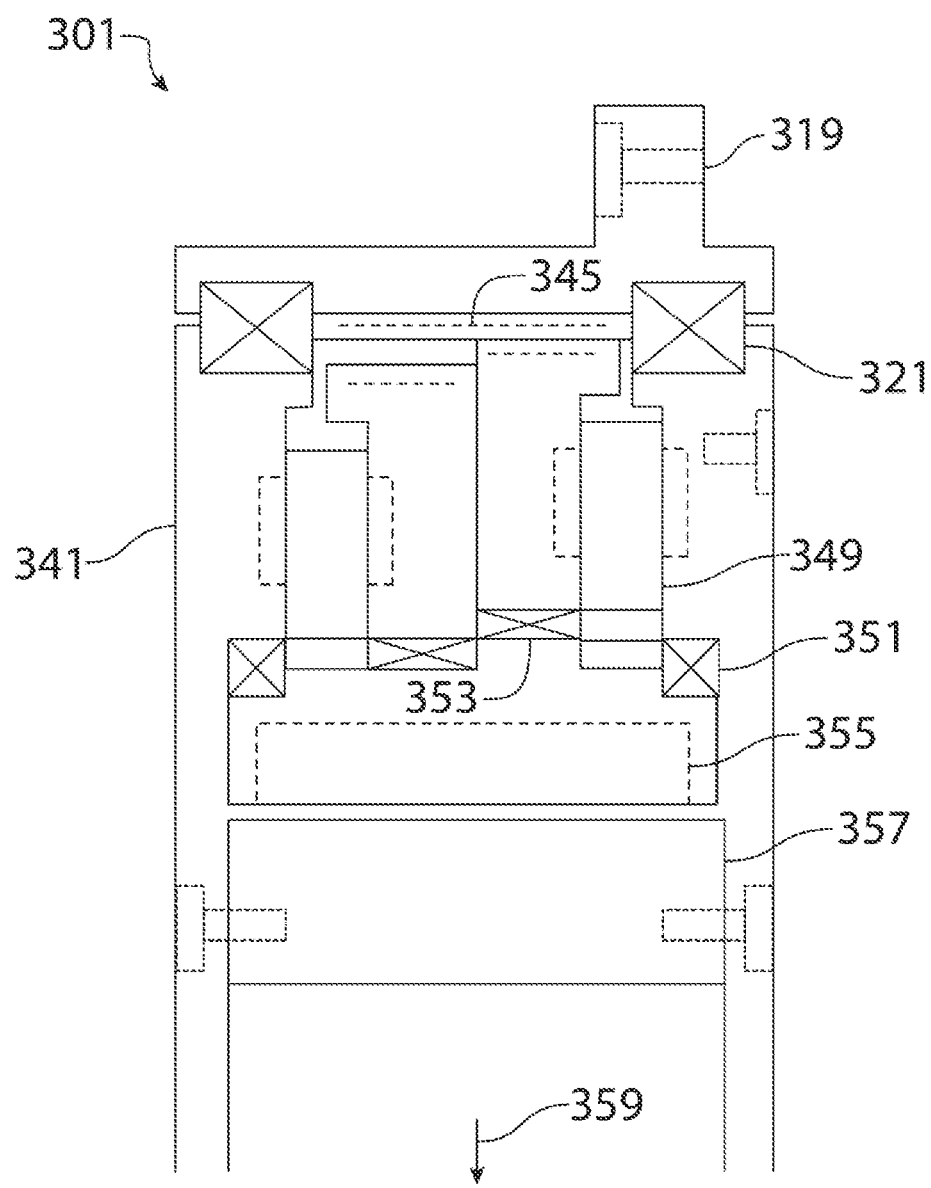
Figure 20:
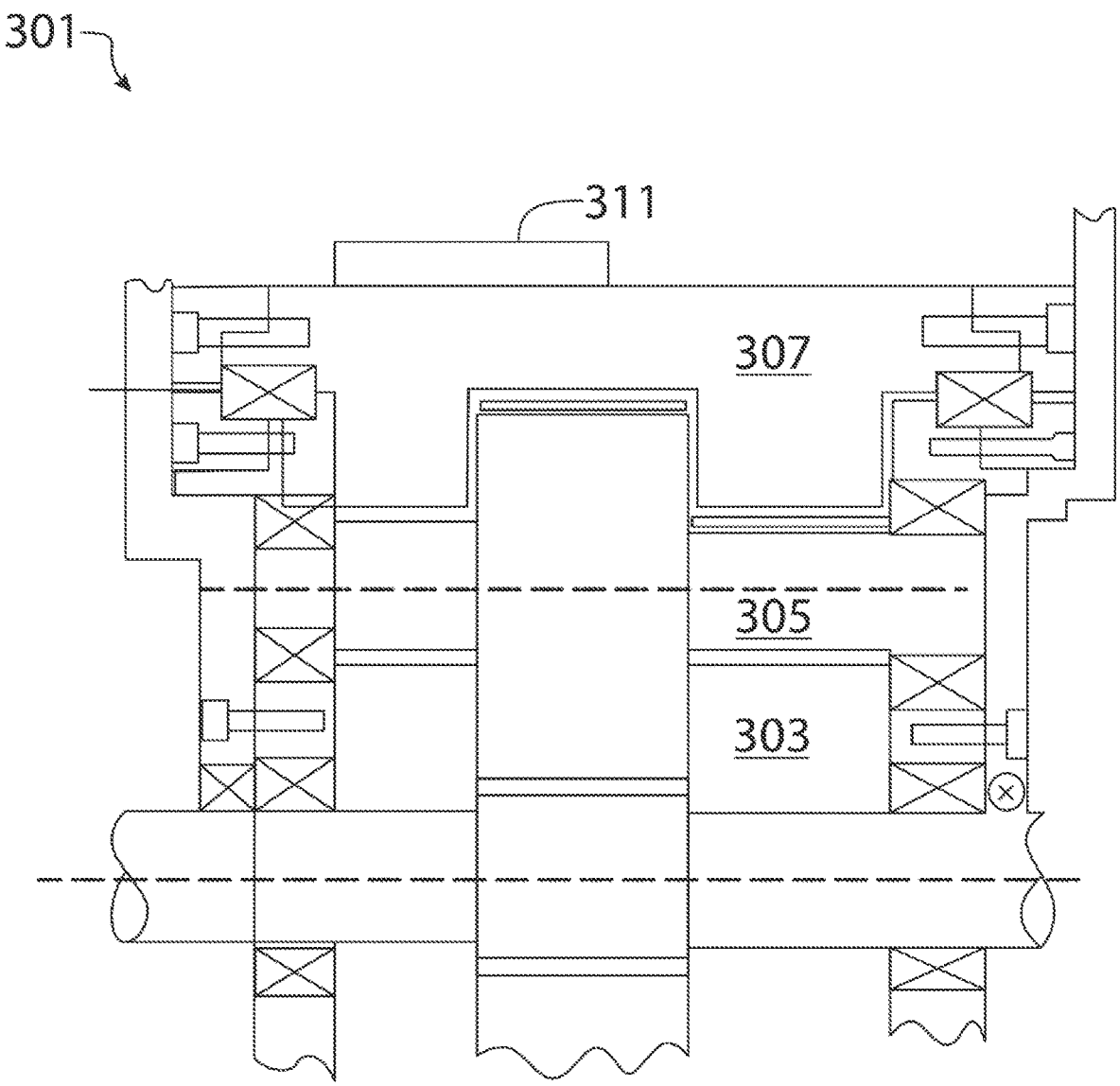
Figure 21:
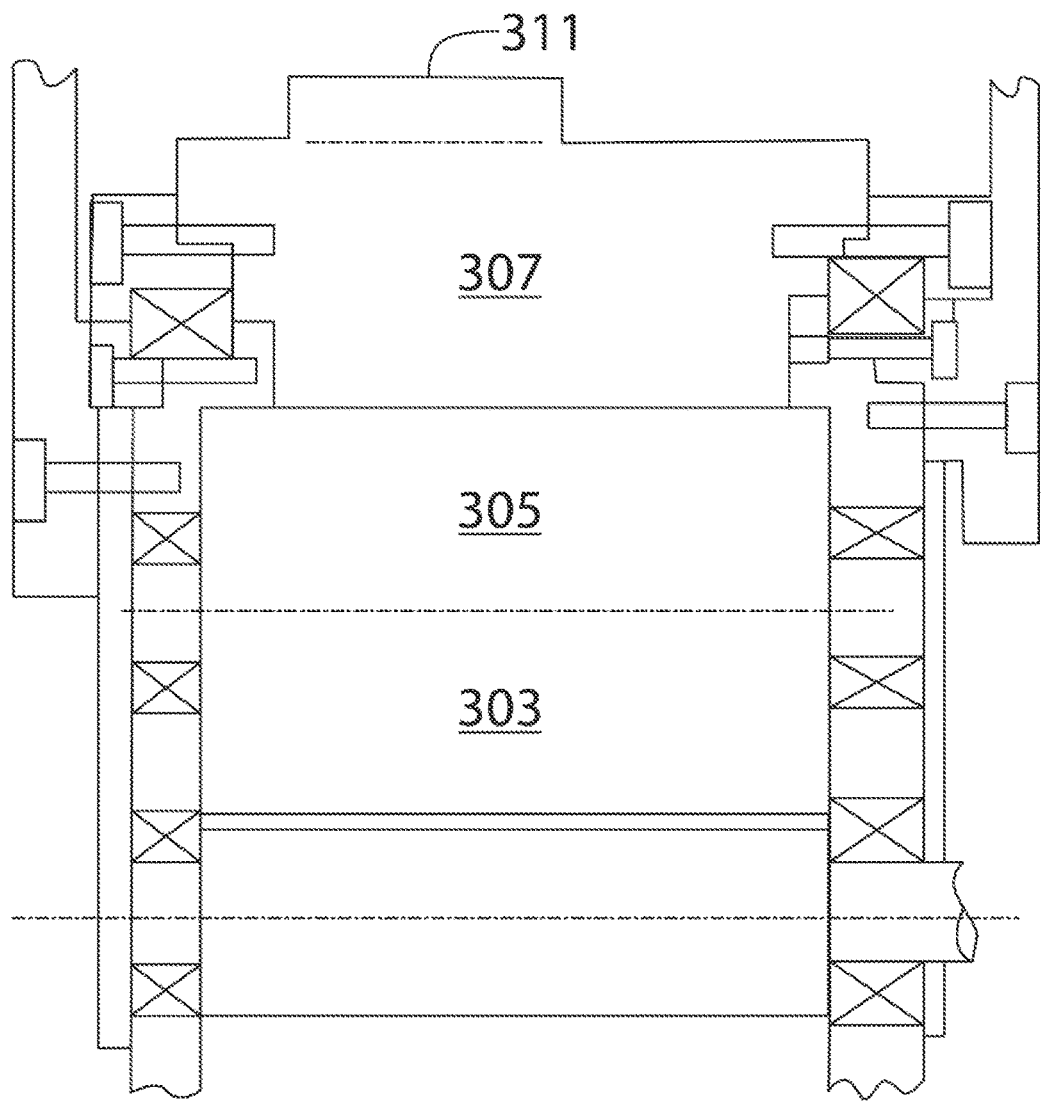
Figure 22:
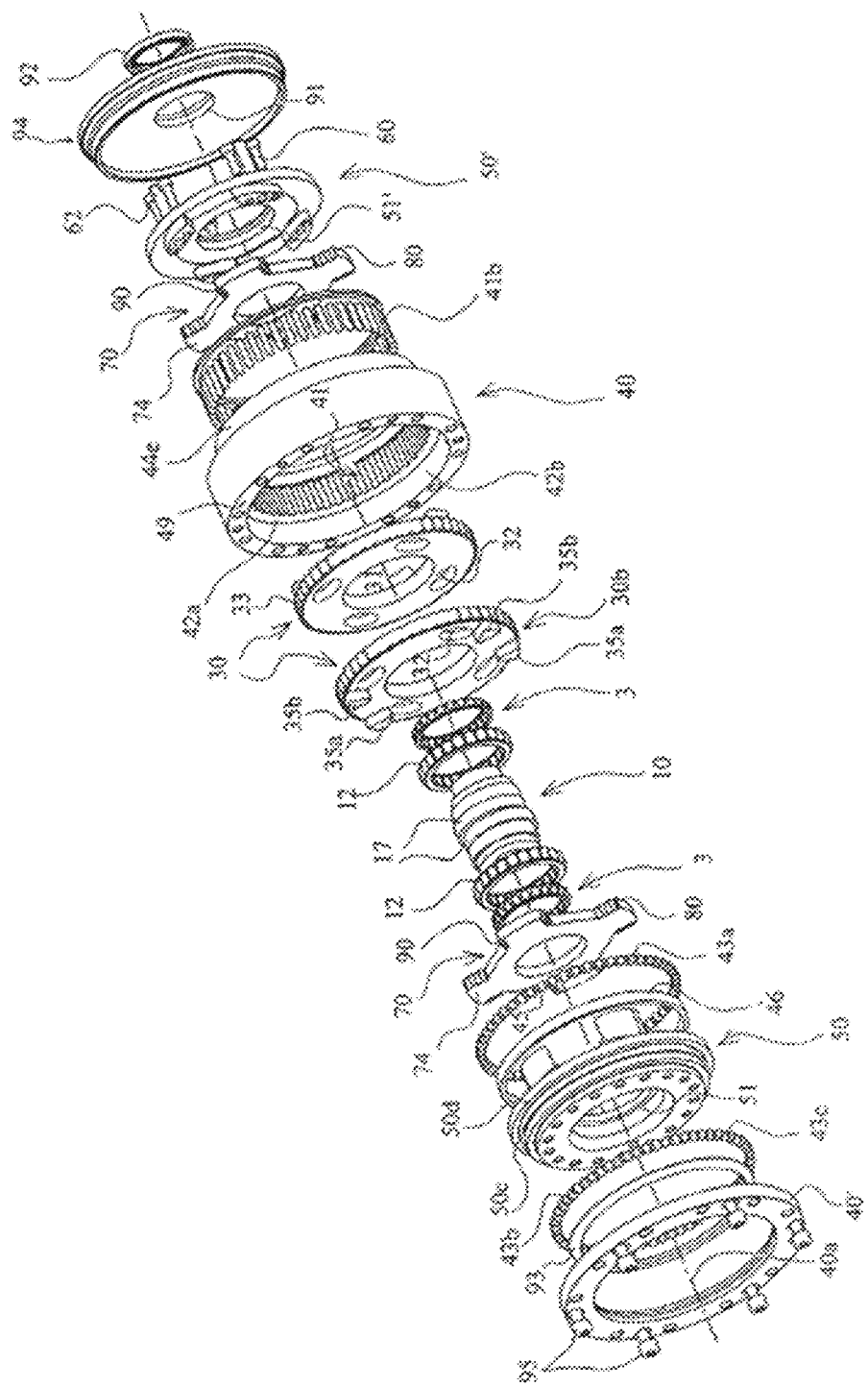
FIG. 22 is an exploded view of a prior art Twin Spin Spinea gear train.

FIGS. 17-21 provide the basic layout of another particular, non-limiting embodiment of a star compound/simplified parallel eccentric rotary actuator in accordance with the teachings herein. These rotary actuators are especially suitable for use in heavy machinery and may be utilized, for example, to replace the various rotary actuators in the excavator of FIG. 16. With reference to FIG. 18, the rotary actuator 301 of FIGS. 17-21 includes a pinion gear 303, a star gear 305, an output gear 307, parallel eccentrics 309, a crankshaft lobe 311, a seal 313, a star compound gear 315, an end cap 317, an output attachment 319, principal tapered bearings 321, a webbed frame 323, webbed parallel gears 325, a crankshaft bearing 327, an attachment frame 329, and a motor input 331. With reference to FIG. 19, the rotary actuator 301 further includes parallel endplates 341, two principal bearings 343, an eccentric gear mesh 345, a reference attachment 347, a crosslink 349, rotor bearings 351, eccentric gear bearings 353, a rotor 355, a stator 357 and a centerline 359. FIGS. 20 and 21 depict, respectively, a star compound gear with a planet amplifier and a one plane star compound gear.

Advantageously, in the rotary actuator 301 of FIGS. 17-21, the parallel eccentric gear mesh 345 is radially separated from the star gear 315 mesh. Preferably, the parallel eccentric gear mesh 345 is radially separated from the star gear 315 mesh across an open space. This arrangement is found to increase torque density, since more teeth are in mesh (due to a larger circumference) for the same tooth width. For example, in some embodiments, the diameter of the tooth radius is increased by a factor of 2 (that is, the diameter of the mesh of the circular arc gear teeth is increased, compared to embodiments in which the foregoing radial separation is missing). Hence, there are more teeth in mesh (e.g., 12 teeth in mesh instead of 6). Consequently, the actuator can carry a larger load. Similarly, in such an embodiment, the moment arm has also increased by a factor of 2.

To obtain basic performance results, the reduction of the star compound is taken to be $R_{sc}=R_1=5.0$, and for the simplified parallel eccentric: $R_{SPE}=R_2=100$, to give a total reduction of 500-to-1. The simple star compound in FIGS. 17-21 may include planet amplifier gears $r_2$, $r_1$ to give a total reduction:

$$R_{sc} = \frac{r_g}{r_p} \times \frac{r_2}{r_1} \approx 10$$

to require a doubling of the motor input speed, which could reduce the weight of the motor somewhat for half the torque. The star compound uses standard involute teeth gearing with well-established load/stress capacity calculations. The output time span for the 120° to 140° output range varies from 3 to 10 sec., or 7 to 2 RPM. This requires a motor input RPM of 3500 to 10,000 RPM.

Most present larger excavators use hydraulic cylinders to create forces $F_c$ to drive rotating joints with effective torques $T_j$ with conceptional moment arms $r_a$. Representative values for these parameters are:

TABLE 26

Representative Parameters for Larger Excavators

| Actuator | Moment Arm $(r_a)$ (ft.) | Force $(F_c)$(lb.) | Torque $(F_j)$(lb.-ft.) |
|---|---|---|---|
| Bucket | 2.0 | 88,500 | 177,000 |
| Stick | 2.9 | 139,600 | 405,000 |
| Boom | 2.7 | 303,000 | 820,000 |

These large numbers represent infrequent peak forces which should be designed with a 25% stress margin (or more). The duty cycle loads over time would likely be 50% of those listed, to give a 120% design margin.

The basic design parameters for the SPE are set forth in TABLE 27 below:

TABLE 27

Representative Design Parameters for Larger Excavators

| Parameter Symbol | Parameter Description |
|---|---|
| $t_a$ | SPE actuator width |
| $d_o$ | outer diameter |
| $d_i$ | inner diameter |
| $w_t$ | teeth width |
| $r_g$ | teeth mesh radius |
| R | reduction ratio (100) |

The basic design measures for the SPE are set forth in TABLE 28 below:

TABLE 28

Representative Design Measures for Larger Excavators

| Measure Symbol | Description |
| --- | --- |
| $S_t$ | tooth shear stress (40,000 psi) |
| $F_t$ | tangential force on teeth |
| $A_t$ | tooth shear area |
| $w_{SPE}$ | parallel eccentric structure width |
| $W_{SPE}$ | parallel eccentric gear structure weight |

Here, $S_t$ is taken to be 80% of the allowable shear stress for quality steel (i.e., 40,000 psi). Then, the tooth shear force is:

$$\overline{F}_t = T_f/r_g \qquad \text{(EQUATION 15)}$$

The required shear area for 6 teeth under peak load is given by:

$$A_t = \overline{F}_t/40{,}000 \qquad \text{(EQUATION 16)}$$

and the tooth width required is given by:

$$w_t = \frac{100\, A_t}{18.84 \times r_g} \qquad \text{(EQUATION 17)}$$

The value of $w_t$ enables the designer to estimate $w_{SPE}$ as the reasonable total width of the SPE structure. Then, its calculated weight in lb. is given by:

$$W_{SPE} = 0.2 \times t_a (d_o^2 - d_i^2) \qquad \text{(EQUATION 18)}$$

TABLE 29 gives a listing of design results for four load cases from 100,000 to 800,000 ft-lb. torque required on medium to heavy duty excavators. The total reduction ratio is constant at R=500, the available tooth shear stress is taken as 40,000 psi for a 25% peak load margin; the weight of the star compound and motor are reasonable estimates, and the outer frame (and crosslink webs, gear and driving crankshaft bearings, etc.) with careful lightening given as expected values.

TABLE 29

Representative Design Measures for Larger Excavators
Representative Numerical Design Values
($R_1 = 5$, $R_2 = 100$, $S_t = 40{,}000$ psi, Operating Time = 3 to 10 Seconds)

|  |  | Case 1 (100,000 lb.) | Case 2 (200,000 lb.) | Case 3 (400,000 lb.) | Case 4 (800,000 lb.) |
| --- | --- | --- | --- | --- | --- |
| Actuator Width (in.) | $t_a$ | 4 | 5 | 8 | 8.5 |
| Outer Diameter (in.) | $d_o$ | 23 | 29 | 32 | 44 |
| Inner Diameter (in.) | $d_i$ | 16.5 | 20.5 | 25 | 30 |
| Tooth Radius (in.) | $r_g$ | 10.75 | 13.5 | 16 | 20 |
| Tooth Load (lb.) | $F_t$ | 111,607 | 177,800 | 300,000 | 480,000 |
| Tooth Area (in$^2$) | $A_t$ | 2.79 | 4.44 | 7.5 | 12.0 |
| Tooth Width (in.) | $w_t$ | 1.378 | 1.75 | 2.49 | 3.185 |
| SPE Weight (lb.) | $W_{SPE}$ | 206 | 420 | 920 | 1650 |
| Est. SC Wt. (lb.) | $W_{sc}$ | 20 | 40 | 80 | 160 |
| Est. Motor Wt. | $W_m$ | 30 | 60 | 120 | 240 |
| Est. Frame Wt. | $W_f$ | 58 | 88 | 120 | 220 |
| Total Est. Wt. | $W_a$ | 314 | 608 | 1240 | 2278 |
| Est. Torq. Den. (lb-ft./lb.) | $T_d$ | 318 | 329 | 326 | 351 |
| Est. Motor Power (h.p.) |  | 15 | 30 | 60 | 120 |

A possibly critical result to validate this SC/SPE design concept is the torque density, which averages 331 ft-lb/lb. This is considered exceptional where most similar systems are at 10 to 30 ft-lb/lb., which is completely inadequate to replace hydraulics. For the median size excavator, the total actuator weight would be 2,162 lb. The large size set would weigh 4,126 lb. These actuators do require an on-board generator to power up to 105 (210) h.p. if all were at their peak loads. The duty cycle suggests 50% of these values as 62.5 (105) h.p., which is quite reasonable. Each prime mover would also require a sizable controller and essential wiring. The efficiency of these systems should range from 70% to 85%, with a further loss of 10% in the generator. Hydraulics is notoriously inefficient (perhaps, with an 80% loss). Electro-mechanical systems are now reaching exceptional durability of 20,000(+) hours, the expected life of the rest of the excavator. Further, hydraulics has an expensive life history of continuous maintenance (including valve, pump, hose, cylinder, leakage).

This description and numerical analysis strongly suggests that it is timely to consider replacing hydraulic actuators on heavy construction machinery. It follows that this approach is also relevant to battlefield operations. For smaller construction machines, it is recommended to use the SPE without the SC, which can be produced in minimum sets to continuously enhance performance-to-cost in an open architecture (plug-and-play) to enable rapid assembly, repair and refreshment. These minimum sets may be produced in a competitive supply chain to further improve performance-to-cost ratios.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims. It will also be appreciated that the various features set forth in the claims may be presented in various combinations and sub-combinations in future claims without departing from the scope of the invention. In particular, the present disclosure expressly contemplates any such combination or sub-combination that is not known to the prior art, as if such combinations or sub-combinations were expressly written out.

What is claimed is:

1. A rotary actuator, comprising:
   first and second opposing endplates;
   a stator having a first end which is attached to said first endplate, and a second end which is attached to said second endplate;
   a rotor having a first eccentric on a surface thereof;
   an output gear disposed about the periphery of said first and second opposing endplates;
   a first parallel eccentric gear which is disposed between said first eccentric and said output gear and which meshes with said output gear across a first mesh;
   a first crosslink which engages said first endplate and said first eccentric gear by way of a first set of surface features; and
   a star compound gear train which includes a star gear which is in mesh with said output gear across a second mesh;
   wherein said first mesh is radially separated from said second mesh across an open space.

2. The rotary actuator of claim 1, wherein said rotor has a second eccentric on a surface thereof, and further comprising:
   a second parallel eccentric gear which is disposed between said second eccentric and said output gear and which meshes with said output gear; and
   a second crosslink which meshes with said second endplate and said second eccentric gear by way of a second set of surface features.

3. The rotary actuator of claim 1, wherein said first and second eccentric gears are adjacent to each other.

4. The rotary actuator of claim 2, wherein said first crosslink is disposed between said first eccentric gear and said first endplate, and wherein said second crosslink is disposed between said second eccentric gear and said second endplate.

5. The rotary actuator of claim 1, wherein said stator has a first end which is rigidly attached to said first plate, and a second end which is rigidly attached to said second plate.

6. The rotary actuator of claim 2, wherein said first and second sets of surface features are selected from the group consisting of tongues and grooves, wherein each of said first and second crosslinks have first and second sets of grooves on opposing major surfaces thereof, wherein said first set of grooves on said first crosslink engage a first set of tongues on said first endplate, and wherein a second set of grooves on said first crosslink engage a second set of tongues on said first eccentric gear, wherein said first set of grooves on said second crosslink engage a first set of tongues on said second endplate, and wherein a second set of grooves on said second crosslink engage a second set of tongues on said second eccentric gear, and wherein said first set of tongues on said first endplate are disposed on a first major surface of said endplate, and wherein said first set of tongues on said second endplate are disposed on a first major surface of said second endplate.

7. The rotary actuator of claim 2, further comprising a first principal bearing disposed between said output gear and said first endplate, and a second principal bearing disposed between said output gear and said second endplate, wherein said first principal bearing is seated in a first depression in said first endplate, wherein said second principal bearing is seated in a second depression in said second endplate, wherein said first principal bearing is seated in a third depression in said output gear, and wherein said second principal bearing is seated in a fourth depression in said output gear.

8. The rotary actuator of claim 7, further comprising a first set of bearing clamps, and wherein said first set of bearing clamps includes a first element of said set which rigidly hold said first principal bearing in said third depression, and a second element of said set which rigidly hold said second principal bearing in said fourth depression.

9. The rotary actuator of claim 2, wherein said first and second parallel eccentric gears mesh with said output gear.

10. The rotary actuator of claim 3, wherein said rotor rotates on a first bearing disposed between said rotor and said first endplate, and a second bearing disposed between said rotor and said second endplate.

11. The rotary actuator of claim 1, further comprising a first eccentric bearing disposed between said first eccentric and said first eccentric gear, and a second eccentric bearing disposed between said second eccentric and said second eccentric gear.

12. The rotary actuator of claim 11, further comprising a wave spring disposed between said first and second eccentric gears, wherein said wave spring applies separating forces to said first and second eccentric gears, and wherein said forces have vector components in opposing directions which preload all tongue and groove constraints.

13. The rotary actuator of claim 1, wherein said first and second parallel eccentric gears are equipped with circular arc gear teeth, and wherein said circular arc gear teeth mesh with said output gear.

14. The rotary actuator of claim 1, further comprising first and second sets of surface features, wherein said first set of surface features prevents said first eccentric gear from rotating, and wherein said second set of surface features prevents said second eccentric gear from rotating.

15. The rotary actuator of claim 1, wherein said actuator has a crankshaft which includes said stator and said rotor, wherein said crankshaft has a first axis of rotation, and wherein said first and second eccentrics have a second axis of rotation which is offset from said first axis of rotation.

16. The rotary actuator of claim 1, further comprising a second set of surface features and a second crosslink, wherein said first and second sets of surface features includes a first set of tongues on said first and second crosslinks which mesh with a first set of grooves on said first and second endplates, respectively, and wherein each tongue in said first set of tongues includes a distal surface and a sidewall which intersect at an angle $\theta$, and wherein $\theta$ is in the range of 95° to 99°.

17. The rotary actuator of claim 1, further comprising a second set of surface features and a second crosslink, wherein said first and second sets of surface features includes a second set of tongues on said first and second crosslinks which mesh with a second set of grooves on said first and second eccentric gears, respectively, and wherein each tongue in said second set of tongues includes a distal surface and a sidewall which intersect at an angle $\theta$, and wherein $\theta$ is in the range of 95° to 99°.

18. The rotary actuator of claim 1, wherein said first and second eccentric gears operate 180° out-of-phase.

19. The rotary actuator of claim 1, wherein said stator forms an external surface of said rotary actuator.

20. An eletromechanical actuator, comprising:
    first and second opposing endplates;
    an output gear disposed about the periphery of said first and second opposing endplates;

a first parallel eccentric gear which is disposed between said first eccentric and said output gear and which meshes with said output gear across a first mesh;

a second parallel eccentric gear which is disposed between said second eccentric and said output gear and which meshes with said output gear;

a first crosslink which engages said first endplate and said first eccentric gear by way of a first set of surface features;

a second crosslink which meshes with said second endplate and said second eccentric gear by way of a second set of surface features;

a crankshaft having first and second eccentrics thereon which engage said first and second parallel eccentric gears; and a star compound gear train which includes a star gear which is in mesh with said output gear across a second mesh;

wherein said first mesh is radially separated from said second mesh across an open space.

* * * * *